(12) United States Patent
Takeda et al.

(10) Patent No.: US 10,945,241 B2
(45) Date of Patent: Mar. 9, 2021

(54) TERMINAL AND RADIO COMMUNICATION METHOD

(71) Applicant: NTT DOCOMO, INC., Tokyo (JP)

(72) Inventors: Kazuaki Takeda, Tokyo (JP); Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/756,830

(22) PCT Filed: Aug. 31, 2016

(86) PCT No.: PCT/JP2016/075565
§ 371 (c)(1),
(2) Date: Mar. 1, 2018

(87) PCT Pub. No.: WO2017/038894
PCT Pub. Date: Mar. 9, 2017

(65) Prior Publication Data
US 2018/0255543 A1    Sep. 6, 2018

(30) Foreign Application Priority Data
Sep. 2, 2015  (JP) .............................. JP2015-173258

(51) Int. Cl.
*H04L 5/00* (2006.01)
*H04W 72/04* (2009.01)
(Continued)

(52) U.S. Cl.
CPC ........ *H04W 72/0413* (2013.01); *H04B 1/713* (2013.01); *H04J 11/00* (2013.01);
(Continued)

(58) Field of Classification Search
None
See application file for complete search history.

(56) References Cited

U.S. PATENT DOCUMENTS

2005/0073985 A1* 4/2005 Heo ..................... H04B 7/2628
370/342
2006/0034285 A1* 2/2006 Pirskanen ............ H04L 1/0007
370/394

(Continued)

OTHER PUBLICATIONS

Ericsson, Study of Shorter TTI for Latency Reduction, Aug. 2015 (Year: 2015).*

(Continued)

*Primary Examiner* — Ayanah S George
(74) *Attorney, Agent, or Firm* — Osha Bergman Watanabe & Burton LLP

(57) ABSTRACT

The invention aims to perform UL transmission in an appropriate manner even when using short transmission time intervals (TTIs). A user terminal includes a transmission section that performs the UL transmission using at least one of a plurality of TTIs contained in one subframe of existing systems, and a control section that controls allocation of an UL signal and/or an UL channel. The TTI is constituted of an even number of symbols of the existing system. The control section allocates an uplink control channel on the basis of the TTI.

3 Claims, 16 Drawing Sheets

(51) Int. Cl.
  *H04B 1/713* (2011.01)
  *H04J 11/00* (2006.01)
  *H04L 1/18* (2006.01)
  *H04W 72/12* (2009.01)
  *H04W 72/02* (2009.01)

(52) U.S. Cl.
  CPC .......... *H04L 1/1812* (2013.01); *H04L 5/0012* (2013.01); *H04L 5/0051* (2013.01); *H04L 5/0055* (2013.01); *H04W 72/04* (2013.01); *H04W 72/0446* (2013.01); *H04W 72/1268* (2013.01); *H04W 72/02* (2013.01)

(56) References Cited

U.S. PATENT DOCUMENTS

| | | | |
|---|---|---|---|
| 2008/0279143 A1 | 11/2008 | Lee et al. | |
| 2010/0303035 A1* | 12/2010 | Gao | H04L 5/0053 370/329 |
| 2012/0039268 A1* | 2/2012 | Hakkinen | H04L 5/001 370/329 |
| 2012/0069793 A1* | 3/2012 | Chung | H04W 76/27 370/315 |
| 2014/0016475 A1* | 1/2014 | Zhou | H04W 72/1242 370/236 |
| 2014/0226607 A1 | 8/2014 | Holma et al. | |

OTHER PUBLICATIONS

Ericsson, Areas for Reducing Latency, May 2015 (Year: 2015).*
International Search Report of the International Searching Authority issued in PCT/JP2016/075565 dated Nov. 29, 2016 (2 pages).
Written Opinion of the International Searching Authority issued in PCT/JP2016/075565 dated Nov. 29, 2016 (4 pages).
Ericsson; "Areas for reducing latency"; 3GPP TSG-RAN WG2 #90, R2-152415; Fukuoka, Japan; May 25-29, 2015 (4 pages).
Ericsson; "Study of shorter TTI for latency reduction"; 3GPP TSG-RAN WG2 #91, R2-153493; Beijing, China; Aug. 24-28, 2015 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Dec. 2014 (251 pages).
Extended European Search Report issued in counterpart European Patent Application No. 16841924.0, dated Mar. 13, 2019 (7 pages).
3GPP TS 36.213 V10.0.0; "3rd Generation Partnership Project; Technical Specification Group Radio Access Network; Evolved Universal Terrestrial Radio Access (E-UTRA); Physical layer procedures (Release 10)" Dec. 2010 (98 pages).
3GPP TS 36.211 V10.0.0; "3rd Generation Partnership Project; Technical Specification Group Radio Access Network; Evolved Universal Terrestrial Radio Access (E-UTRA); Physical channels and modulation (Release 10)" Dec. 2010 (103 pages).
Office Action issued in European Application No. 16841924.0, dated Oct. 28, 2019 (5 Pages).
Office Action issued in Japanese Application No. 2017-538084; dated Nov. 4, 2020 (6 pages).

* cited by examiner

TERMINAL AND RADIO COMMUNICATION METHOD

TECHNICAL FIELD

The present invention relates to a user terminal, a radio base station, and a radio communication method in next-generation mobile communication systems.

BACKGROUND ART

In Universal Mobile Telecommunications System (UMTS) networks, Long Term Evolution (LTE) has been specified for the purpose of providing increased data rates, reduced delay, and the like (non-patent document 1). To achieve further broadbandization and increased speed beyond LTE (also referred to as LTE Release 8), LTE-Advanced (also referred to as LTE Release 10, 11, or 12) is specified and successor systems thereto (e.g. LTE Release 13 and the like) are studied.

In LTE Releases 10 and 11, Carrier Aggregation (CA), which aggregates multiple component carriers (CCs), is introduced in order to achieve broadbandization. Each CC is structured in units of system bandwidths of LTE Release 8. In CA, the CCs from a single radio base station (eNodeB: eNB) are allocated to a user terminal (user equipment: UE).

In LTE Release 12, Dual Connectivity (DC), which allocates multiple cell groups (CGs) from different radio base stations to a user terminal, is introduced. Each CG is constituted of at least one cell (CC). Since DC aggregates the CCs from the different radio base stations, DC is also referred to as Inter-eNB CA and the like.

In LTE Releases 8 to 12, a transmission time interval (TTI) is set at 1 ms in DL transmission and UL transmission between radio base stations and user terminals. In LTE systems (Releases 8 to 12), the TTI is also referred to as a subframe length.

CITATION LIST

Non-Patent Literature

Non-patent document 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems of LTE Release 13 or later, 5G, and the like envision communication in high frequency bands of several tens of GHz, and communication of relatively small amounts of data such as Internet of Things (IoT), Machine Type Communication (MTC), and Machine To Machine (M2M). Applying a communication method of LTE Releases 8 to 12 (e.g. TTIs of 1 ms) to the future radio communication systems may be unable to offer sufficient communication services. Demands for Device To Device (D2D) and Vehicular To Vehicular (V2V), which require short delay communication, have been increasing too.

Thus, in the future radio communication systems, communication using short TTIs that are set shorter than 1 ms is considered. In this case, a user terminal may perform communication with a plurality of cells using different TTIs (for example, by CA or DC). However, when using the short TTIs, the issue of how to arrange (allocate) transmission signals and/or transmission channels arises. For example, there arises a problem that how the user terminal that performs UL transmission using the short TTIs arranges (allocates) UL signals and/or UL channels to control the UL transmission.

Considering the above, one of objects of the present invention is to provide a user terminal, a radio base station, and a radio communication method that can perform UL transmission in an appropriate manner even when using short TTIs.

Solution to Problem

A user terminal according to an aspect of the present invention includes a transmission section that performs UL transmission using at least one of a plurality of transmission time intervals (TTIs) contained in one subframe of existing systems, and a control section that controls the allocation of an UL signal and/or an UL channel. The TTI is constituted of an even number of symbols of the existing systems. The control section allocates an uplink control channel on the basis of the TTI.

Technical Advantageous of Invention

According to the present invention, even when using short TTIs, UL transmission can be performed in an appropriate manner.

DESCRIPTION OF EMBODIMENTS

Figure 1:
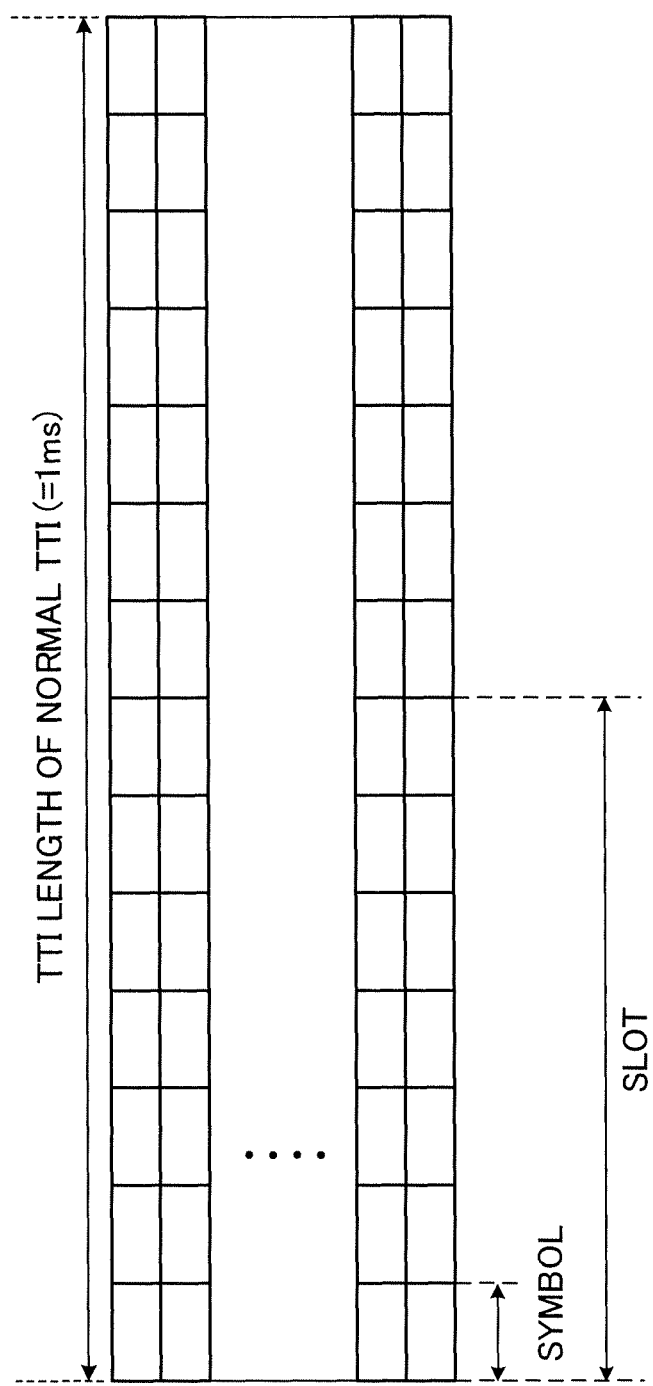
FIG. 1 is a drawing depicting an example of a transmission time interval (TTI) in existing LTE systems (Releases 8 to 12)

FIG. 1 is an explanatory view of an example of a transmission time interval (TTI) in existing systems (LTE Releases 8 to 12). As depicted in FIG. 1, in LTE Releases 8 to 12, the TTI (hereinafter referred to as "normal TTI") has a time length of 1 ms. The normal TTI is also referred to as a subframe. The normal TTI is constituted of two time slots. The normal TTI is a transmission time unit of one channel-coded data packet (transport block), and is a processing unit of scheduling, link adaptation, and the like.

As depicted in FIG. 1, when using normal cyclic prefixes (CPs) in a downlink (DL), the normal TTI is constituted of fourteen orthogonal frequency division multiplexing (OFDM) symbols (seven OFDM symbols per slot). Each OFDM symbol has a time length (symbol length) of 66.7 μs, and a normal CP of 4.76 μs is added therebetween. Since a subcarrier interval is the reciprocal of the symbol length, when the symbol length is 66.7 μs, the subcarrier interval is 15 kHz.

In an uplink (UL) using normal cyclic prefixes (CPs), the normal TTI is constituted of fourteen single carrier frequency division multiple access (SC-FDMA) symbols (seven SC-FDMA symbols per slot). Each SC-FDMA symbol has a time length (symbol length) of 66.7 μs, and a normal CP of 4.76 μs is added therebetween. Since a subcarrier interval is the reciprocal of the symbol length, when the symbol length is 66.7 μs, the subcarrier interval is 15 kHz.

When using extended CPs, the normal TTI may be constituted of twelve OFDM symbols (or twelve SC-FDMA symbols). In this case, each OFDM symbol (or each SC-FDMA symbol) has a time length of 66.7 μs, and an extended CP of 16.67 μs is added therebetween.

Future radio communication systems of LTE Release 13 or later, 5G, and the like desire a radio interface appropriate for high frequency bands of several tens of GHz, and a radio interface that minimizes delay intended for Internet of Things (IoT), Machine Type Communication (MTC), Machine To Machine (M2M), Device To Device (D2D), and Vehicular To Vehicular (V2V) services.

Figure 2:
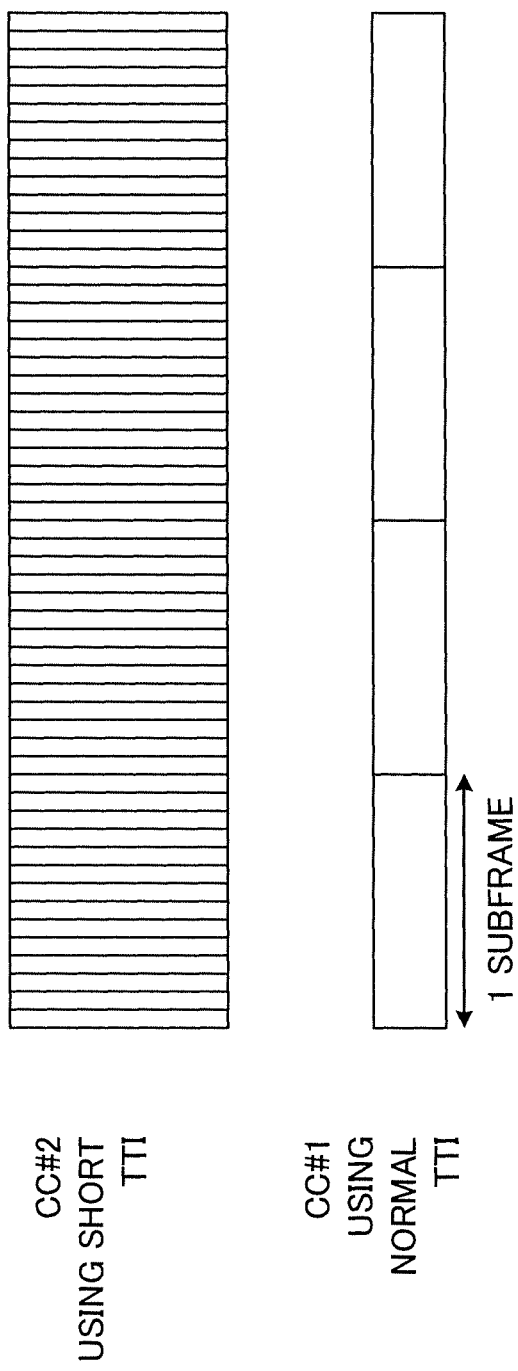
FIG. 2 is an explanatory view of a normal TTI and a short TTI.

Thus, in the future radio communication systems, communication may be performed using short TTIs that are shorter than 1 ms (see FIG. 2). FIG. 2 depicts a cell (CC #1) using the normal TTIs (1 ms) and a cell (CC #2) using the short TTIs. When using the short TTIs, a subcarrier interval may be changed (for example, a subcarrier interval may be increased) from that when using the normal TTIs.

When using the TTIs (hereinafter referred to as "short TTIs") shorter than the normal TTIs, an increase in a time margin in processing (e.g. encoding and decoding) in user terminals and radio base stations allows a reduction in processing delay. Using the short TTIs also allows an increase in the number of accessible user terminals per unit of time (for example, 1 ms). The structure of the short TTI and the like will be described below.

(Examples of Structure of Short TTI)

Figure 3A:
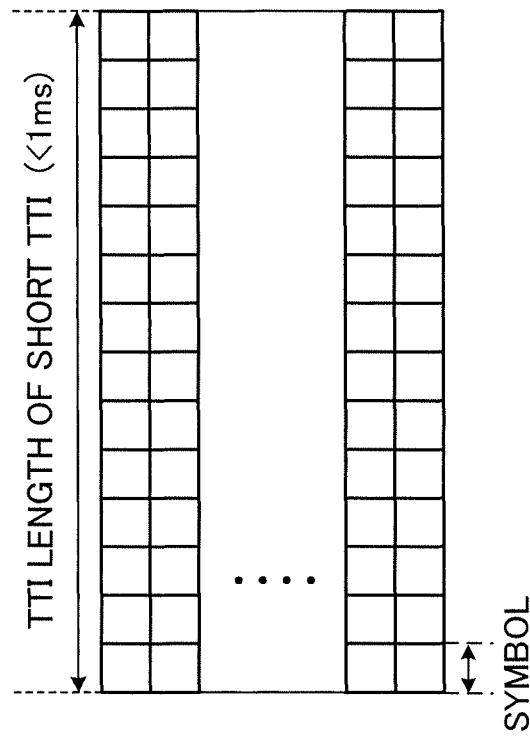
FIGS. 3A and 3B are drawings depicting examples of the structure of the short TTI.
Figure 3B:
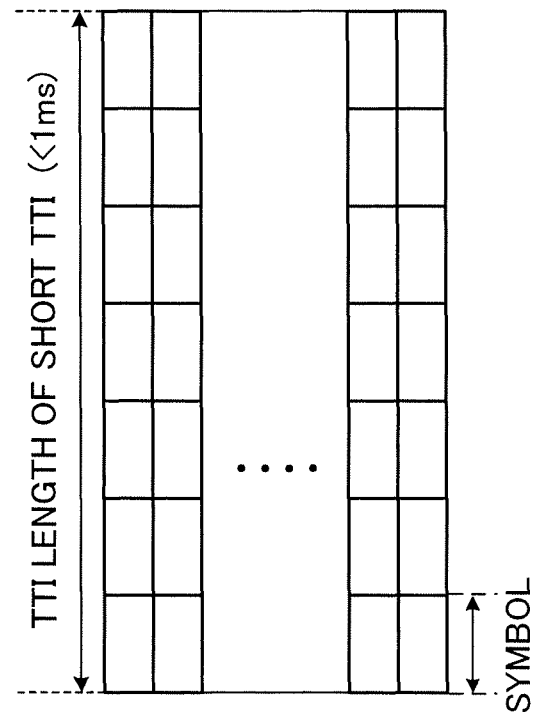

Examples of the structure of the short TTI will be described with reference to FIGS. 3A and 3B. As depicted in FIGS. 3A and 3B, the short TTI has a time length (TTI length) shorter than 1 ms. The short TTI may have a TTI length of, for example, 0.5 ms, 0.25 ms, 0.2 ms, or 0.1 ms the integral multiple of which is 1 ms.

FIGS. 3A and 3B describe the cases of using normal CPs as examples, but the invention is not limited thereto. The short TTI may have any length as long as it is shorter than the normal TTI, and may have any structure as to the number of symbols, the length of each symbol, and the length of each CP. OFDM symbols are used in a DL and SC-FDMA symbols are used in an UL in the following description, but the invention is not limited thereto.

FIG. 3A depicts a first example of the structure of the short TTI. In the first example, as depicted in FIG. 3A, the short TTI is constituted of fourteen OFDM symbols (or SC-FDMA symbols) the number of which is the same as that of the normal TTI. Each OFDM symbol (or each SC-FDMA symbol) has a symbol length shorter than the symbol length (=66.7 μm) of the normal TTI.

When shortening the symbol length while maintaining the number of the symbols of the normal TTI, as depicted in FIG. 3A, a physical layer signal structure of the normal TTI can be shared. When shortening the symbol length while maintaining the number of the symbols of the normal TTI, the amount of information (the number of bits) contained (included) in the short TTI is reduced, as compared with the normal TTI, due to an increase in subcarrier intervals.

FIG. 3B depicts a second example of the structure of the short TTI. In the second example, as depicted in FIG. 3B, the short TTI is constituted of a less number of OFDM symbols (or SC-FDMA symbols) than the normal TTI. Each OFDM symbol (or each SC-FDMA symbol) has the same symbol length as the symbol length (=66.7 μm) of the normal TTI. In this case, the short TTI is structured in units of a symbol contained (included) in the normal TTI. For example, the short TTI is structured using a part of fourteen symbols contained in one subframe. In FIG. 3B, the short TTI is constituted of seven OFDM symbols (or SC-FDMA symbols), which is half the number of the symbols of the normal TTI.

When reducing the number of the symbols while maintaining the symbol length, as depicted in FIG. 3B, the amount of information (the number of bits) contained in the short TTI is reduced, as compared with the normal TTI. User terminals can process (e.g. demodulate, decode, and the like) reception information contained in the short TTI in shorter time than in the normal TTI, thus allowing a reduction in processing delay. Signals contained in the short TTI of FIG. 3B can be multiplexed on signals of the normal TTI in the same CC (for example, orthogonal frequency division multiplexing: OFDM), thus allowing maintaining compatibility with the normal TTI.

(Examples of Configuration of Short TTIs)

Figure 4A:
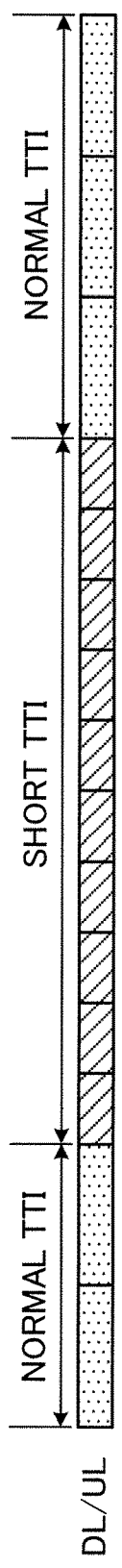
FIGS. 4A to 4C are drawings depicting examples of the configuration of normal TTIs and the short TTIs.
Figure 4B:
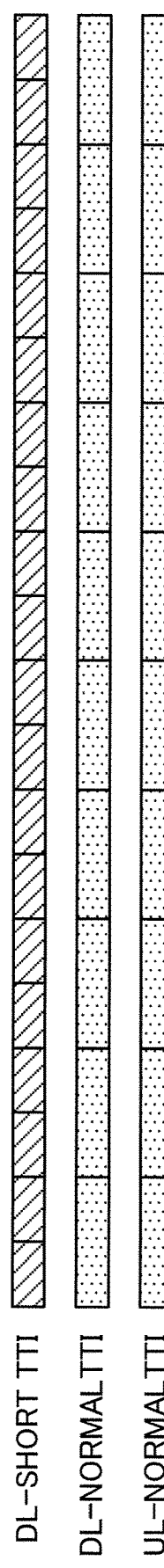
Figure 4C:
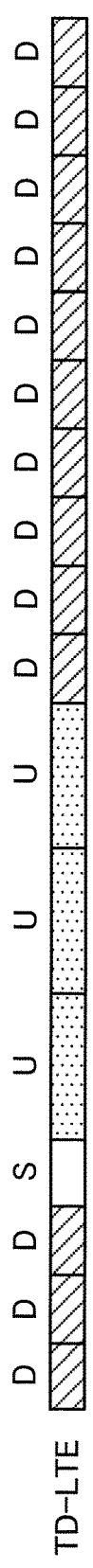

Examples of the configuration of the short TTIs will be described. When using the short TTIs, user terminals may be configured for both of the normal TTIs and the short TTIs so as to have compatibility with existing systems (LTE Releases 8 to 12). FIGS. 4A to 4C depict examples of the configuration of the normal TTIs and the short TTIs. Note that, FIGS. 4A to 4C depict just examples, and the configuration of the TTIs is not limited thereto.

FIG. 4A is a drawing of a first example of the configuration of the short TTIs. As depicted in FIG. 4A, the normal TTIs and the short TTIs may be temporally mixed in a single component carrier (CC) (a single frequency band). To be more specific, the short TTIs may be configured in specific subframes (or specific radio frames) of the single CC. For example, in FIG. 4A, the short TTIs are configured in continuous five subframes of the single CC, while the normal TTIs are configured in the other subframes. The specific subframes may be, for example, subframes allocated for MBSFN transmission, and subframes that carry (or do not carry) specific signals such as MIB and synchronization channels. The number and positions of the subframes in which the short TTIs are configured are not limited to the example of FIG. 4A.

FIG. 4B is a drawing of a second example of the configuration of the short TTIs. As depicted in FIG. 4B, CCs of the normal TTIs and a CC of the short TTIs may be aggregated in Carrier Aggregation (CA) or Dual Connectivity (DC). To be more specific, the short TTIs may be configured in a specific CC (more specifically, a DL and/or an UL of the specific CC). For example, in FIG. 4B, the short TTIs are configured in a downlink of a specific CC, and the normal TTIs are configured in a downlink and an uplink of other CCs. The number and positions of CCs in which the short TTIs are configured are not limited to the example of FIG. 4B.

In CA, the short TTIs may be configured in a specific CC (primary (P) cell or/and secondary (S) cell) from a single radio base station. In DC, on the other hand, the short TTIs may be configured in a specific CC (P cell or/and S cell) in a master cell group (MCG) formed by a first radio base station, or a specific CC (primary secondary (PS) cell or/and S cell) in a secondary cell group (SCG) formed by a second radio base station.

FIG. 4C is a drawing of a third example of the configuration of the short TTIs. As depicted in FIG. 4C, the short TTIs may be configured in any of a DL and an UL. For example, in FIG. 4C, the normal TTIs are configured in the UL, while the short TTIs are configured in the DL in a TDD system.

The short TTIs may be allocated to (configured in) a specific channel or signal in a DL or an UL. For example, the normal TTIs may be allocated to a physical uplink control channel (PUCCH), while the short TTIs may be allocated to a physical uplink shared channel (PUSCH).

A multi-access scheme different from OFDM (or SC-FDMA), which is a multi-access scheme for LTE Releases 8 to 12, may be allocated to (configured in) the short TTIs.

As described above, in the future radio communication, it is assumed that the short TTIs that are shorter than the normal TTIs are applied to the UL transmission and/or the DL transmission. The future radio communication is assumed to have compatibility with the existing systems as described above. In this case, the short TTI is assumed to be constituted of a part of the fourteen symbols contained in the normal TTI (one subframe) in the existing systems (see FIG. 3B).

In this case, however, there arises the problem of how to establish the short TTIs and how to arrange (allocate) transmission signals and/or transmission channels in the short TTIs. For example, when a user terminal performs UL transmission using short TTIs, how to establish the short TTIs and how to allocate UL signals and/or UL channels therein becomes a problem.

Thus, the inventors have come up with the idea of establishing short TTIs in units of a symbol of existing systems, and controlling allocation of signals and/or channels in the short TTIs in consideration of compatibility with the radio frame structure of the existing systems. In an aspect of an embodiment, a plurality of short TTIs are established in one subframe of the existing systems and the allocation of an UL signal and/or an UL channel is controlled in each short TTI in consideration of the one subframe of the existing systems.

In the embodiment, a plurality of short TTIs are established in one subframe of existing systems, and a user terminal controls so as to allocate an UL signal and/or an UL channel to an even number of symbols of the existing systems. For example, the short TTI is constituted of an even number of symbols of the existing systems. In this case, the establishment of the short TTIs, the allocation of an uplink control channel, and the like can be controlled in consideration of the allocation of an uplink measurement reference signal and the like. When the user terminal controls the allocation of the UL signal and/or the UL channel using the even number of symbols of the existing systems, the UL signal and/or the UL channel allocated to different frequency ranges by frequency hopping have/has an equal number of symbols.

Therefore, since the short TTIs are established and the number of symbols allocated to the UL signal and/or the UL channel (or the number of symbols per TTI) is controlled in consideration of the radio frame structure of the existing systems, it is possible to perform communication in an appropriate manner with maintaining compatibility with the existing systems, even when using the short TTIs.

This embodiment will be described below in detail. In the following description, a transmission unit having a time length shorter than the normal TTI (1 ms) is referred to as short TTI, but the name of the transmission unit is not limited to the "short TTI". The following description takes an LTE system as an example, but this embodiment is not limited thereto. This embodiment is applicable to any system using short TTIs.

(First Aspect)

A first aspect describes a method for allocating (mapping) an UL signal and/or an UL channel in short TTIs. The following description describes the allocation of UL transmission by taking an uplink control channel (e.g. PUCCH) and an uplink measurement reference signal (e.g. SRS) as an example, but the invention is not limited thereto. For example, a demodulation reference signal may be allocated to a symbol and/or a subcarrier next to a region to which the uplink control channel is allocated. User data (e.g. PUSCH) may be allocated to a region to which no uplink control channel is allocated.

<One TTI Constituted of One Slot>

Figure 5:
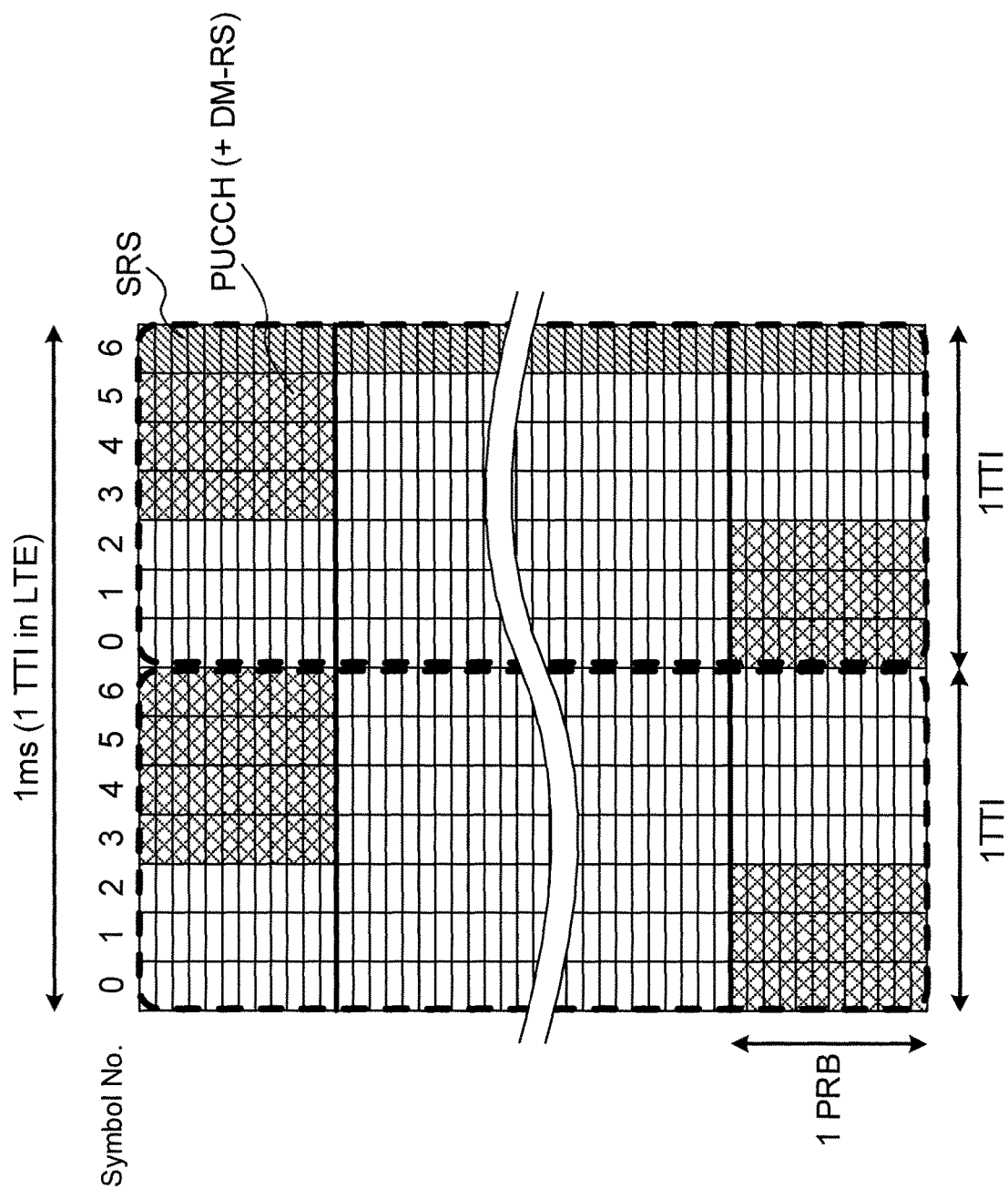
FIG. 5 is a drawing depicting short TTIs and an example of allocation of an UL signal and an UL channel according to a first aspect.

FIG. 5 depict an example of a method for allocating an UL signal and/or an UL channel, when a short TTI is constituted of one slot of a subframe of existing systems (one TTI=one slot). In this case, two short TTIs, i.e. a short TTI corresponding to a first slot and a short TTI corresponding to a second slot, are configured in one subframe of the existing systems.

A user terminal allocates an UL signal and/or an UL channel to each short TTI. For example, the user terminal applies frequency hopping to an uplink control channel (e.g. PUCCH) to control the allocation in each short TTI. This allows obtaining a frequency diversity effect, even when using the short TTIs.

In FIG. 5, the uplink control channel can be allocated to seven symbols in the short TTI corresponding to the first slot. In this case, the user terminal controls such that the uplink control channel allocated to different frequency ranges by the frequency hopping has different numbers of symbols.

The short TTI corresponding to the second slot is also constituted of seven slots. On the other hand, in the existing systems, an uplink measurement reference signal (e.g. SRS: sounding reference signal (symbol)) is allocated to the last symbol of the subframe (second slot). In this case, the user terminal preferably allocates no uplink control channel to the last symbol, in order to prevent collision between the uplink control channel and the uplink measurement reference signal.

Thus, the user terminal controls so as to allocate the uplink control channel to six symbols (symbols #0 to #5) except for the symbol to which the uplink measurement reference signal is applied. In this case, the user terminal controls such that the uplink control channel allocated to different frequency ranges by the frequency hopping has an equal number of symbols (three symbols, here).

Thus, when the short TTI is constituted of one slot of one subframe of the existing systems, the user terminal can control the allocation of the UL signal and/or the UL channel using the different mapping methods between the short TTI corresponding to the first slot and the short TTI corresponding to the second slot. Therefore, it is possible to improve use efficiency of radio resources, while considering the allocation of the uplink measurement reference signal, which is defined in the existing systems.

The user terminal can control so as to multiplex the uplink control channel allocated to the short TTIs with an uplink control channel allocated to an existing system (normal TTIs). In this case, the multiplexing (e.g. frequency division multiplexing and/or code division multiplexing) is controlled so as to prevent collision (orthogonalize) between a resource of the uplink control channel allocated to the short TTIs and a resource of the uplink control channel of the existing system.

The user terminal can allocate the uplink measurement reference signal in the TTI corresponding to the second slot. However, when no SRS is transmitted, the uplink control channel may be allocated to the last symbol, just as with the short TTI corresponding to the first slot.

The user terminal may control so as not to allocate the uplink control channel to the seventh symbol (#6) of the first slot. Therefore, even when the TTI is constituted of one slot (seven symbols) of the existing systems, the uplink control channel allocated to different frequency ranges by the frequency hopping has an equal number of symbols.

<One TTI Constituted of Even Number of Symbols>

In this embodiment, a short TTI may be constituted of an even number of symbols of existing systems. In this case, a user terminal controls allocation of UL signals and/or UL channels in the short TTI that is constituted of the even number of symbols of the existing systems. Since the short TTI is constituted of the even number of symbols, the UL channel (e.g. uplink control channel) distributed in a frequency direction by frequency hopping has an equal number of symbols. The even number of symbols for constituting the short TTI may be six, four, or two. Short TTIs that are constituted of different numbers of symbols may be used in combination.

Short TTI Constituted of Six Symbols

Figure 6:
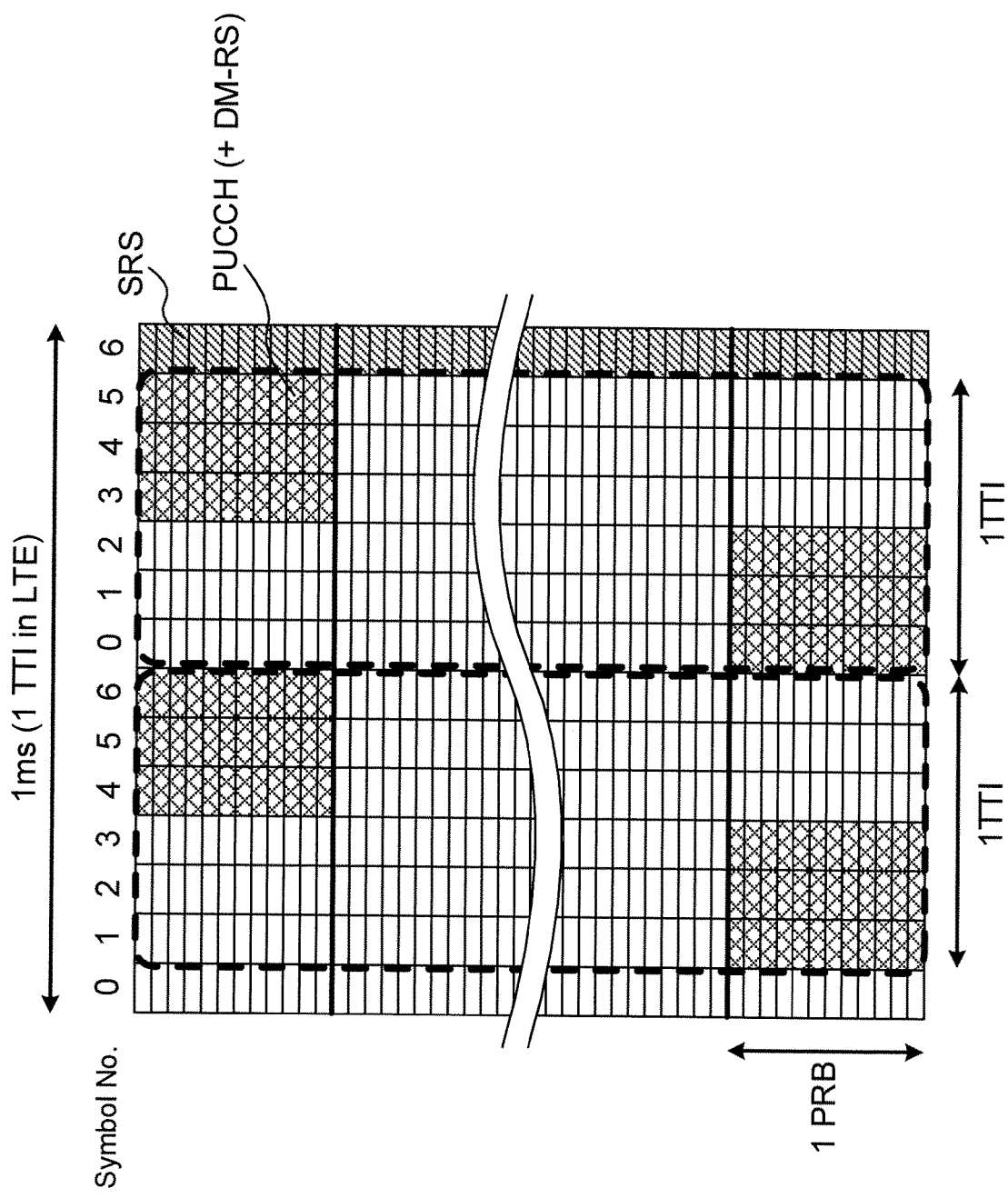
FIG. 6 is a drawing depicting short TTIs and another example of allocation of the UL signal and the UL channel according to the first aspect.

FIG. 6 depict an example of a method for allocating an UL signal and/or an UL channel when a short TTI is constituted of six symbols of existing systems (one TTI=six symbols). In this case, two short TTIs are configured in one subframe of the existing systems.

In FIG. 6, there are a short TTI corresponding to six symbols from the second symbol (#1) to the seventh symbol (#6) of the first slot, and the other short TTI corresponding to six slots from the first symbol (#0) to the sixth symbol (#5) of the second slot.

A user terminal allocates an UL signal and/or an UL channel to each short TTI. For example, the user terminal applies frequency hopping to an uplink control channel (e.g. PUCCH) to control the allocation in each short TTI.

In FIG. 6, the uplink control channel can be allocated to six (even number) symbols in each short TTI. In this case, the user terminal controls such that the uplink control channel allocated to different frequency ranges by the frequency hopping has an equal number of symbols (three symbols, here). Applying the frequency hopping to the allocation of the uplink control channel to the different frequency ranges in a symmetric manner serves to simplify the allocation control, and allows obtaining a frequency diversity effect, even when using the short TTIs.

The short TTIs may contain neither the first symbol (symbol #0 of the first slot) nor the last symbol (symbol #6 of the second slot), or may not contain one of the first symbol and the last symbol in one subframe of the existing systems. When the short TTIs do not contain the last symbol, the user terminal can control the allocation of the UL signal and/or the UL channel without using the symbol (last symbol) to which an uplink measurement reference signal is intended to be allocated, as a symbol of the short TTI in one subframe of the existing systems.

This allows preventing collision between the uplink measurement reference signal and the uplink control channel allocated to the short TTI. The user terminal can allocate the uplink control channel using a regular PUCCH format (not shortened PUCCH format), irrespective of the presence or absence of the allocation of the uplink measurement reference signal.

When the short TTI does not contain the first symbol, the user terminal can control the allocation of the UL signal and/or the UL channel without using the first symbol (symbol #0 of the first slot) as a symbol of the short TTI. Disusing the first symbol can ease conditions for timing advance control in the user terminal, and facilitate applying the timing advance control.

The timing advance control refers to operation for controlling the transmission timing of the UL signal from each user terminal so that the reception timings of the UL signals transmitted from a plurality of user terminals coincide in a radio base station. In other words, a user terminal that is far from the radio base station is controlled so as to start transmitting the UL signal earlier than the other user terminals. In this case, by disusing the first symbol, as depicted in FIG. 6, the user terminal can easily control the timings of UL transmission (early start UL transmission), as compared with the case of performing the UL transmission from the first symbol.

The user terminal can control allocation so as to multiplex the uplink control channel allocated to the short TTI with an uplink control channel allocated to an existing system (normal TTI). In this case, the multiplexing (e.g. frequency division multiplexing and/or code division multiplexing) is controlled so as to prevent collision between a resource of the uplink control channel allocated to the short TTI and a resource of the uplink control channel of the existing system.

The user terminal may allocate signals (e.g. a reference signal, PRACH, and the like) other than UL data (e.g. PUCCH) and UL control information (e.g. PUCCH) to the first symbol that is not contained in the short TTI.

Short TTI Constituted of Four Symbols

Figure 7:
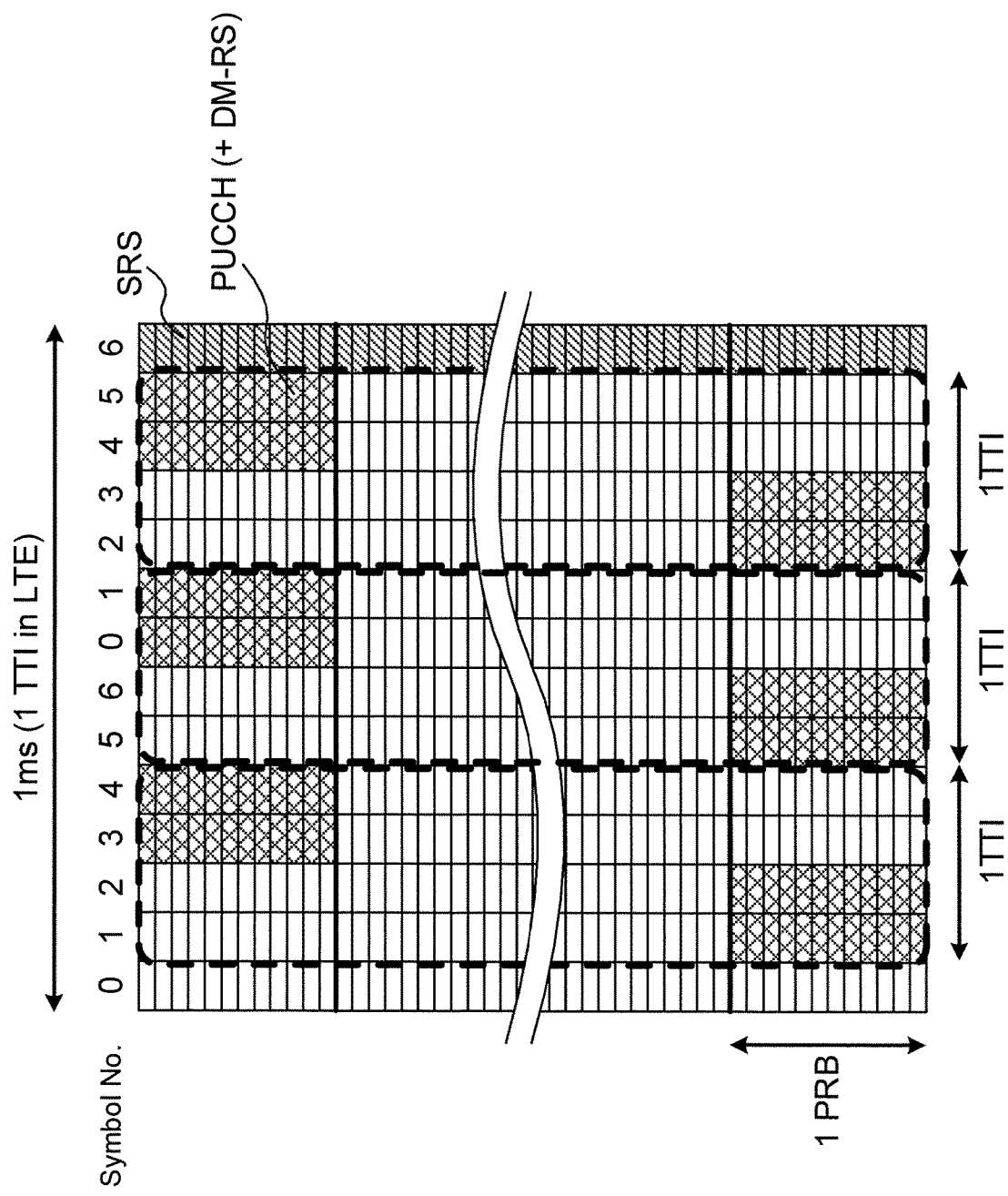
FIG. 7 is a drawing depicting short TTIs and another example of allocation of the UL signal and the UL channel according to the first aspect.

FIG. 7 depict an example of a method for allocating an UL signal and/or an UL channel when a short TTI is constituted of four symbols of existing systems (one TTI=four symbols). In this case, three short TTIs are configured in one subframe of the existing systems.

In FIG. 7, there are a short TTI corresponding to four symbols from the second symbol (#1) to the fifth symbol (#4) of the first slot, another short TTI corresponding to four slots from the sixth symbol (#5) of the first slot to the second symbol (#1) of the second slot, and the other short TTI corresponding to four slots from the third symbol (#2) of the second slot to the sixth symbol (#5) of the second slot.

A user terminal applies frequency hopping to an uplink control channel (e.g. PUCCH) to control allocation in each short TTI. In FIG. 7, the uplink control channel can be allocated to four (even number) symbols in each short TTI. Thus, the user terminal controls such that the uplink control channel allocated to different frequency ranges by the frequency hopping has an equal number of symbols (two symbols, here). Applying the frequency hopping to the allocation of the uplink control channel to the different frequency ranges in a symmetric manner serves to simplify the allocation control, and allows obtaining a frequency diversity effect, even when using the short TTIs.

The short TTIs may contain neither the first symbol (symbol #0 of the first slot) nor the last symbol (symbol #6 of the second slot), or do not contain one of the first symbol and the last symbol in one subframe of the existing systems.

When the short TTIs do not contain the last symbol, the user terminal can control the allocation of the UL signal and/or the UL channel without using the symbol (last symbol) to which an uplink measurement reference signal is intended to be allocated, as a symbol of the short TTI in one subframe of the existing systems.

When the short TTIs do not contain the first symbol, the user terminal can control the allocation of the UL signal and/or the UL channel without using the first symbol (symbol #0 of the first slot) as a symbol of the short TTI. Disusing the first symbol can ease conditions for timing advance control in the user terminal, and facilitate applying the timing advance control.

The user terminal can allocate a reference signal (DM-RS) to be used for demodulation of the uplink control channel to a region (e.g. next resource element) next to a region (resource element) to which the uplink control channel is allocated in a temporal direction and/or in a frequency direction.

For example, in FIG. 7, the user terminal may allocate the demodulation reference signal to a symbol (e.g. symbol #2 of the first slot) next to a symbol (e.g. symbol #1 of the first slot) to which the uplink control channel is allocated. In the same manner, when the user terminal allocates the uplink control channel to the symbol #3 of the first slot, the user terminal may allocate the demodulation reference signal to the next symbol (e.g. symbol #4 of the first slot).

The user terminal may allocate (frequency division multiplex) the uplink control channel and the demodulation reference signal to different subcarriers of the same symbol (e.g. symbol #1 of the first slot). In this case, the user terminal may allocate the uplink control channel and the demodulation reference signal to continuous two symbols (e.g. symbols #1 and #2 of the first slot).

Short TTI Constituted of Two Symbols

Figure 8:
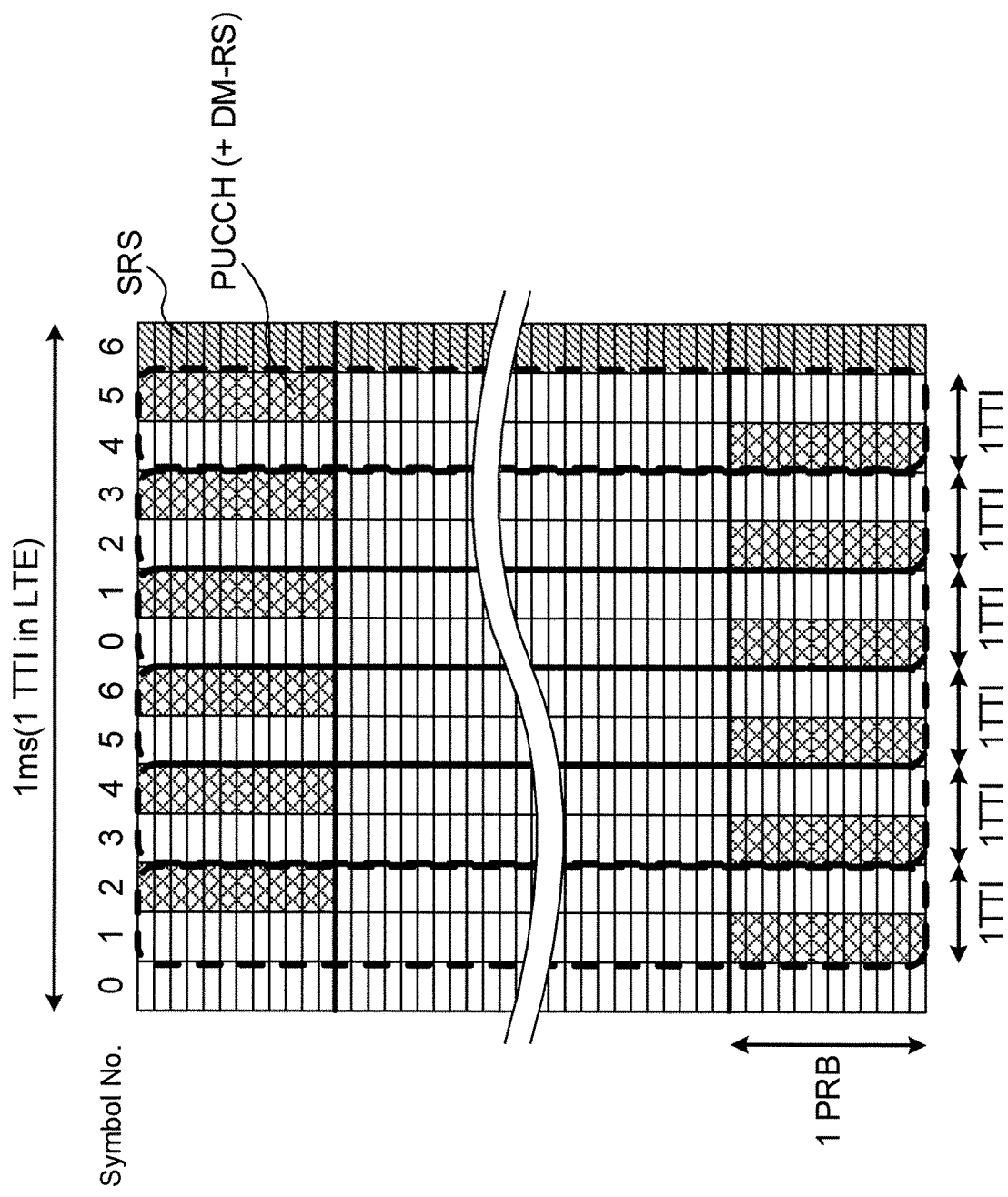
FIG. 8 is a drawing depicting short TTIs and another example of allocation of the UL signal and the UL channel according to the first aspect.

FIG. 8 depict an example of a method for allocating an UL signal and/or an UL channel when a short TTI is constituted of two symbols of existing systems (one TTI=two symbols). In this case, six short TTIs are configured in one subframe of the existing systems. In other words, it is possible to increase a short delay effect as compared with FIGS. 6 and 7.

In FIG. 8, a plurality of short TTIs each of which is constituted of two symbols are configured in a region from the second symbol (#1) of the first slot to the sixth symbol (#5) of the second slot.

A user terminal applies frequency hopping to an uplink control channel (e.g. PUCCH) to control allocation in each short TTI. In FIG. 8, the uplink control channel can be allocated to two (even number) symbols in each short TTI. Thus, the user terminal controls such that the uplink control channel allocated to different frequency ranges by the frequency hopping has an equal number of symbols (one symbol, here). Applying the frequency hopping to the allocation of the uplink control channel to the different frequency ranges in a symmetric manner serves to simplify the allocation control, and allows obtaining a frequency diversity effect, even when using the short TTIs.

The short TTIs may contain neither the first symbol (symbol #0 of the first slot) nor the last symbol (symbol #6 of the second slot), or may not contain one of the first symbol and the last symbol in one subframe of the existing systems.

The user terminal can allocate a reference signal (DM-RS) to be used for demodulation of the uplink control channel to a region (symbol) to which the uplink control channel is allocated. For example, in FIG. 8, the user terminal can allocate (frequency division multiplex) the uplink control channel and the demodulation reference signal to different subcarriers of the same symbol (e.g. symbol #1 of the first slot).

(Second Aspect)

A second aspect describes HARQ-ACK (ACK/NACK) feedback control on DL transmission when using short TTIs. In the following description, UL transmission short TTIs are each constituted of four symbols of existing systems (refer to FIG. 7), but this embodiment is not limited thereto. This embodiment is applicable in the same manner to another structure (for example, the short TTIs may be each constituted of two, six, or seven symbols). The following describes HARQ-ACK control when using the short TTIs in FDD, but this embodiment is applicable to TDD as well as FDD.

Figure 9:
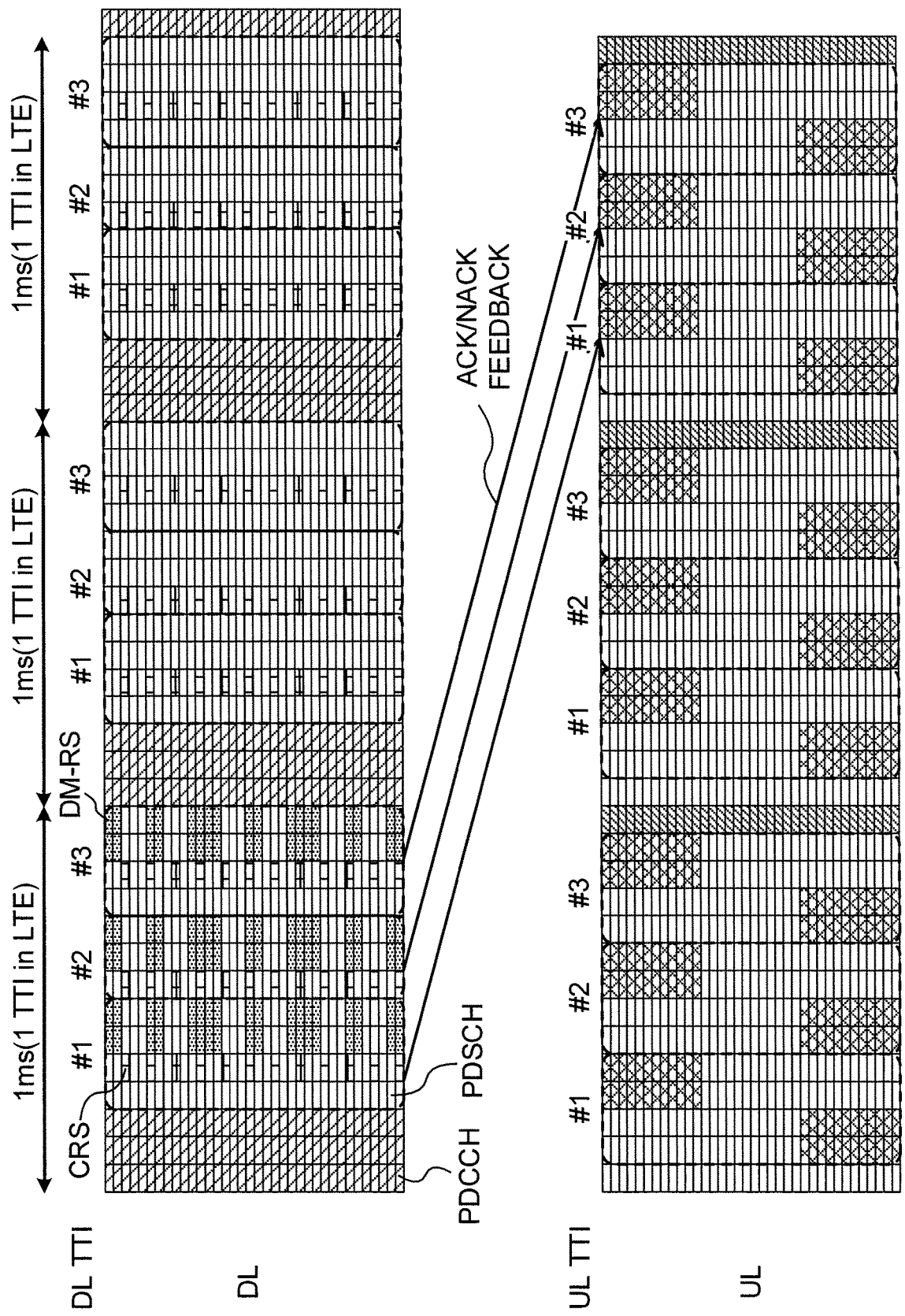
FIG. 9 is a drawing depicting an example of HARQ timing when using short TTIs according to a second aspect.

FIG. 9 depicts an example of HARQ-ACK (DL HARQ) control on DL transmission. A user terminal feeds back an ACK/NACK (ACKnowledgement/Negative ACKnowledgement) signal in response to a DL transmission signal by using an UL transmission short TTI after a lapse of a certain time period from the reception of the DL signal.

For example, the user terminal controls ACK/NACK feedback using a short TTI contained in a subframe of existing systems that is a certain time period later than a subframe (n) including a TTI (e.g. short TTI) in which a DL signal is received. Thus, the user terminal controls ACK/NACK feedback timing in units of a subframe of the existing systems. In FIG. 9, ACK/NACK signals in response to DL signals received in short TTIs contained in a subframe (n) are transmitted in short TTIs contained in a subframe (n+2) after a certain period (e.g. 2 ms) later.

Figure 10:
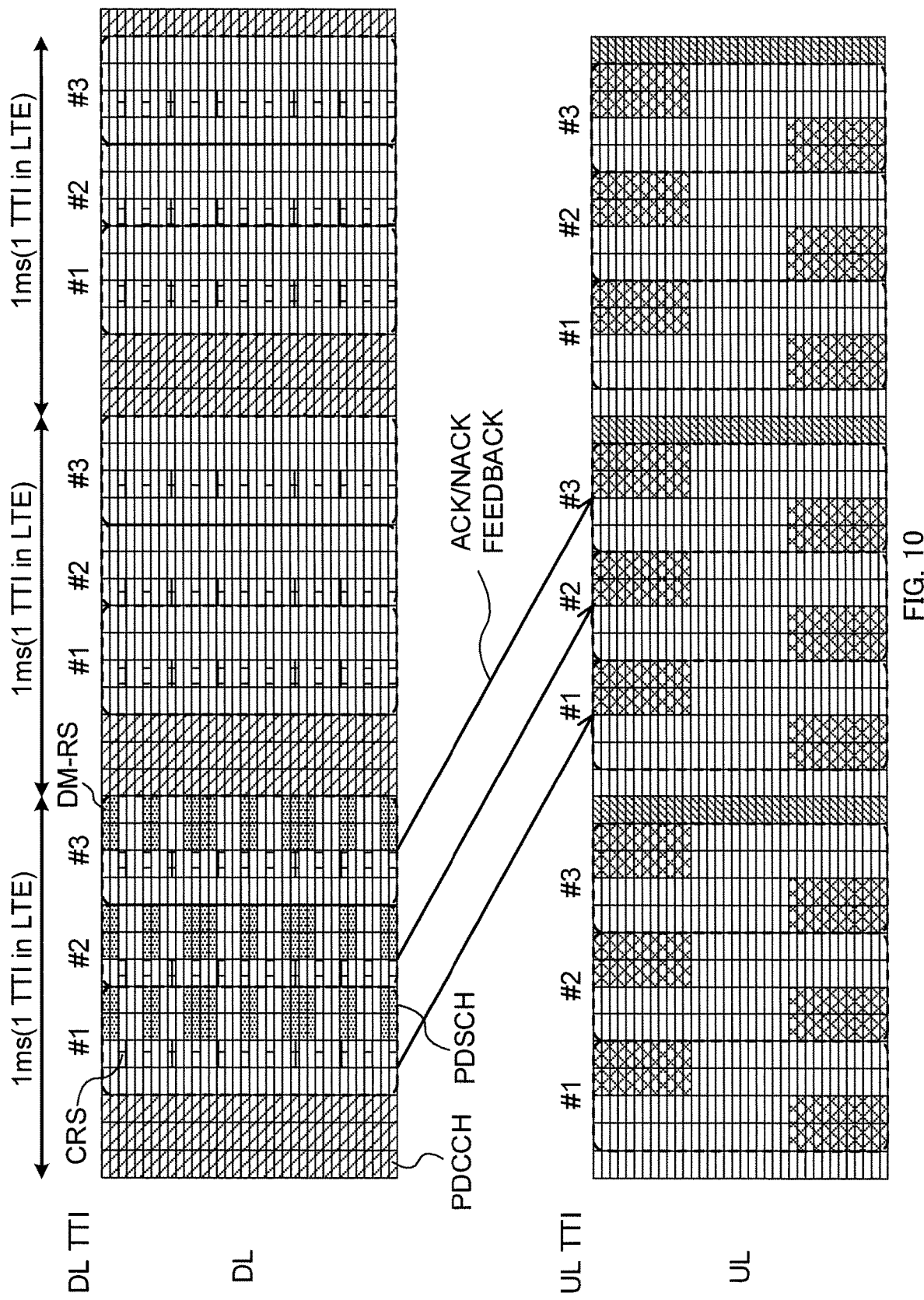
FIG. 10 is a drawing depicting another example of HARQ timing when using the short TTIs according to the second aspect.

The feedback timing of the ACK/NACK signal by the user terminal is not limited to 2 ms, and the user terminal may transmit the ACK/NACK signals in short TTIs contained in a subframe (n+1) after 1 ms (see FIG. 10). The user terminal may control the ACK/NACK feedback timing in units of a short TTI, instead of in units of a subframe of the existing systems. In FIG. 9, the user terminal feeds back an ACK/NACK signal in an UL transmission short TTI after six TTIs later than a short TTI in which a DL signal is received. Note that, the ACK/NACK feedback timing may be determined based on (in relation to) the number of short TTIs contained in the existing subframe and/or the number of symbols constituting the short TTI.

When a DL and an UL contain an equal number of TTIs in one subframe of the existing systems, the user terminal feeds back ACK/NACK signals in response to DL signals transmitted in DL transmission short TTIs contained in one subframe, using UL transmission short TTIs contained in one subframe after a certain time period. In FIG. 9, the user terminal feeds back an ACK/NACK signal in response to a DL signal transmitted in a DL transmission short TTI #1 contained in each subframe using an UL transmission short TTI #1 contained in a subframe after a certain time period.

The DL transmission short TTI and the UL transmission short TTI may be constituted of an equal number of symbols, or different numbers of symbols. When the DL (e.g. DL data) transmission short TTIs and the UL (e.g. UL data) transmission short TTIs are temporally multiplexed, the DL transmission short TTIs and the UL transmission short TTIs may be configured in one subframe of the existing systems.

A radio base station controls retransmission of a DL signal using a short TTI based on an ACK/NACK signal transmitted from the user terminal. For example, the radio base station performs the retransmission in a DL transmission short TTI after a certain time period (e.g. two subframes or six short TTIs) later than the reception of the ACK/NACK signal fed back from the user terminal (see FIG. 11).

Figure 11:
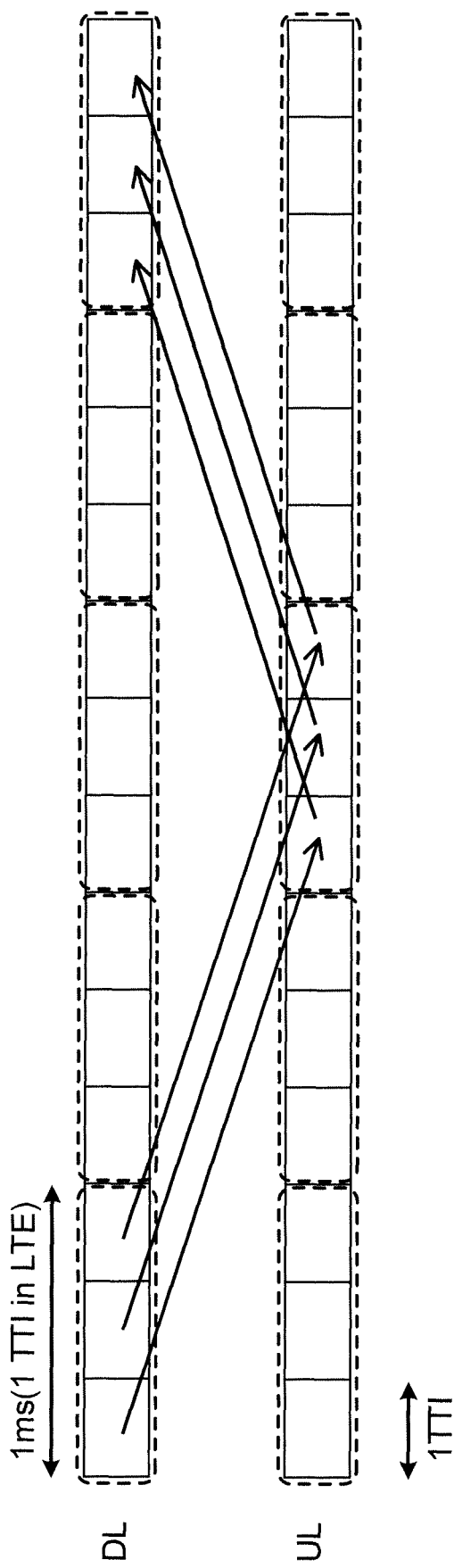
FIG. 11 is a drawing depicting another example of HARQ timing when using the short TTIs according to the second aspect.

The radio base station and/or the user terminal control/controls the retransmission based on certain HARQ RTT (round trip time) in transmission and reception of signals. In FIG. 11, the RTT is shortened to 4 ms from 8 ms of the existing systems. The RTT refers to time between the transmission of a signal or data to a communication partner and the reception of a reply.

As described above, using the short TTIs serves to shorten time required for the retransmission control. When using the short TTIs, the radio base station and the user terminal can perform HARQ-ACK control by establishing a different HARQ process number (HPN) from the existing systems. The HARQ process number (HARQ process IDs) refers to the number of HARQ processes for one transport block (TB).

In the existing systems, eight HARQ process IDs are specified at the maximum when applying FDD, and HARQ processes can be performed in parallel. On the other hand, when using short TTIs in the FDD, the HARQ process number (for example, the number of the short TTIs contained in one subframe ×RTT) can be set at 12.

When using the short TTIs, the HARQ process number can be determined based on the short TTIs contained in one subframe of the existing systems and/or RTT when using the short TTIs. Thus, even when using the short TTIs, communication can be performed by establishing an appropriate HARQ process number. When using TDD, the HARQ process number can be set based on UL/DL structures.

(Radio Communication System)

The structure of a radio communication system according to an embodiment of the present invention will be described below. The radio communication system applies radio communication methods according to the above aspects. The radio communication methods according to the above aspects may be applied separately or in combination.

Figure 12:
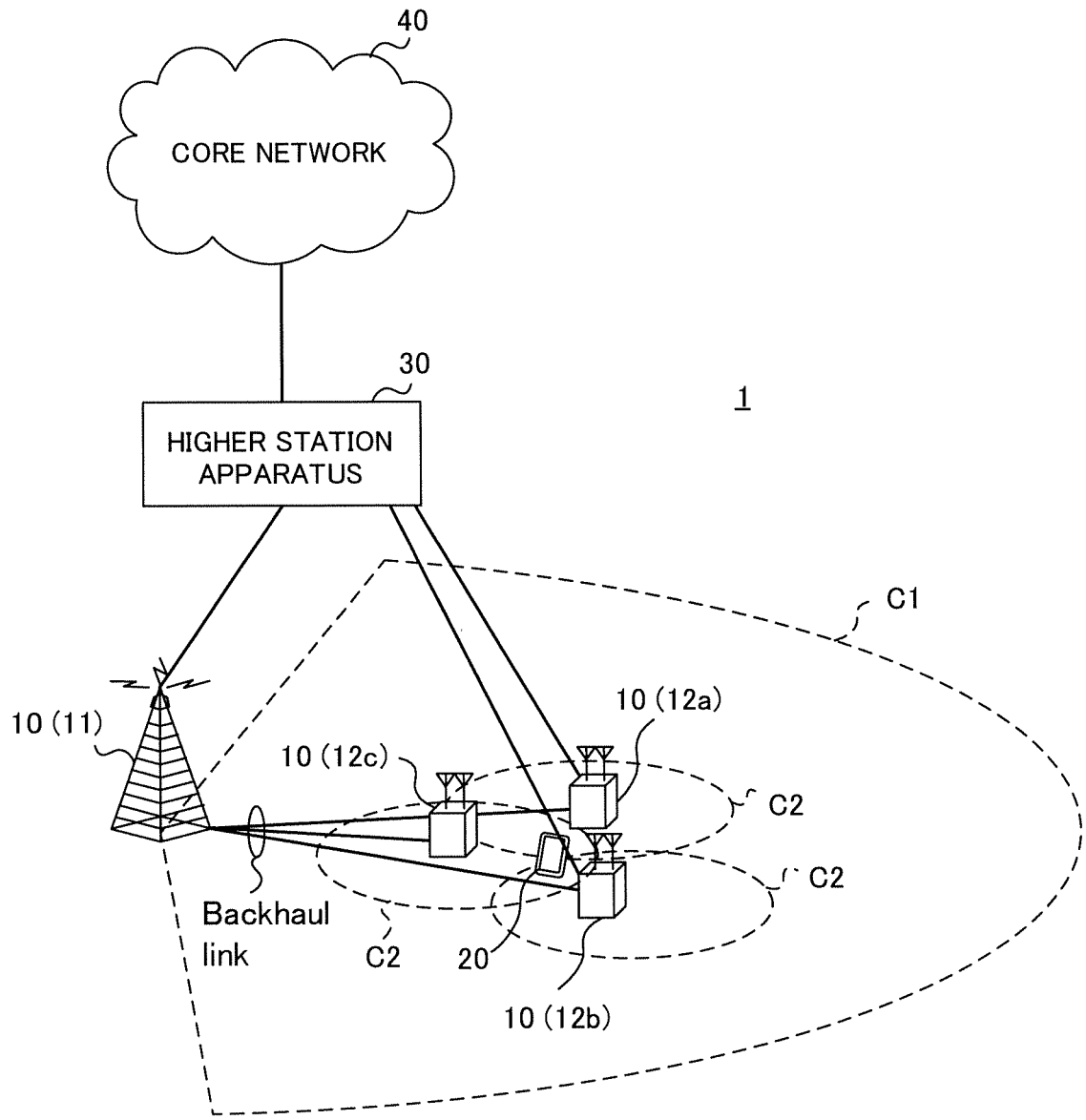
FIG. 12 is a schematic configuration diagram of an example of a radio communication system according to an embodiment.

FIG. 12 is a drawing depicting an example of the schematic configuration of the radio communication system according to the embodiment of the present invention. A radio communication system 1 applies Carrier Aggregation (CA) and/or Dual Connectivity (DC) to aggregate multiple basic frequency blocks (component carriers) in units of system bandwidths (e.g. 20 MHz) of LTE systems. The radio communication system 1 may be also referred to as SUPER 3G, LTE-Advanced (LTE-A), IMT-Advanced, 4G, 5G, Future Radio Access (FRA), and the like.

As depicted in FIG. 12, the radio communication system 1 includes a radio base station 11 for forming a macro cell C1, and radio base stations 12a to 12c that are disposed in the macro cell C1 and form small cells C2 smaller than the macro cell C1. A user terminal 20 is disposed in the macro cell C1 and the small cells C2.

The user terminal 20 can be connected to both of the radio base station 11 and the radio base stations 12. It is assumed that the user terminal 20 concurrently uses the macro cell C1 and the small cells C2 using different frequencies by CA or DC. The user terminal 20 may apply CA or DC using a plurality of cells (CCs) (e.g. six or more CCs). Short TTIs can be applied to UL transmission and/or DL transmission between the user terminal 20 and the radio base station 11 or between the user terminal 20 and the radio base stations 12. The user terminal can communicate with the radio base stations using at least two CCs having different TTI lengths.

The user terminal 20 can communicate with the radio base station 11 using a narrow band carrier (referred to as an existing carrier, a legacy carrier, and the like) in a relatively low frequency band (for example, 2 GHz). On the other hand, the user terminal 20 may communicate with the radio base station 12 using a wide band carrier in a relatively high frequency band (for example, 3.5 GHz, 5 GHz, or the like), or using the same carrier as for the radio base station 11. The structure of the frequency band used in each radio base station is not limited thereto.

The radio base station 11 and the radio base station 12 (or the two radio base stations 12) are connected with a wire (e.g. a Common Public Radio Interface (CPRI)-compliant optical fiber, an X2 interface, or the like), or connected wirelessly.

Each of the radio base stations 11 and 12 is connected to a higher station apparatus 30, and connected to a core network 40 through the higher station apparatus 30. The higher station apparatus 30 includes, for example, an access gateway, a radio network controller (RNC), a mobility management entity (MME), and the like, but is not limited thereto. Each radio base station 12 may be connected to the higher station apparatus 30 through the radio base station 11.

The radio base station 11 is a radio base station having a relatively large coverage, and may be also referred to as a macro base station, an aggregation node, an eNodeB (eNB), a transmitting/receiving point, and the like. The radio base station 12 is a radio base station having a local coverage, and may be also referred to as a small base station, a micro base station, a pico base station, a femto base station, a Home eNodeB (HeNB), a remote radio head (RRH), a transmitting/receiving point, and the like. The radio base stations 11 and 12 are collectively called radio base stations 10 below, when not distinguishing therebetween.

Each user terminal 20 is a terminal compliant to various communication schemes such as LTE and LTE-A, and may include a stationary communication terminal, as well as a mobile communication terminal.

In the radio communication system 1, Orthogonal Frequency Division Multiple Access (OFDMA) is applied to a downlink, while Single Carrier Frequency Division Multiple Access (SC-FDMA) is applied to an uplink, as radio access schemes. OFDMA is a multicarrier transmission scheme in which a frequency band is divided into narrow frequency bands (subcarriers) and communication is performed by mapping data to each subcarrier. SC-FDMA is a single carrier transmission scheme in which a system bandwidth is divided on a terminal-by-terminal basis into bands each of which is constituted of one or two or more continuous resource blocks, and terminals use the different bands from each other in order to reduce interference between the terminals. The uplink and downlink radio access schemes are not limited to this combination, and OFDMA may be used in the uplink.

The radio communication system 1 uses a physical downlink shared channel (PDSCH), a physical broadcast channel (PBCH), a downlink L1/L2 control channel, and the like shared among the user terminals 20, as downlink channels. The PDSCH carries user data, higher layer control information, system information blocks (SIBs), and the like. The PBCH carries a master information block (MIB).

The downlink L1/L2 control channel includes a physical downlink control channel (PDCCH), an enhanced physical downlink control channel (EPDCCH), a physical control format indicator channel (PCFICH), a physical hybrid-ARQ indicator channel (PHICH), and the like. The PDCCH carries downlink control information (DCI) including scheduling information on the PDSCH and the PUSCH, and the like. The PCFICH carries the number of OFDM symbols used in the PDCCH. The PHICH carries HARQ delivery confirmation information (ACK/NACK) associated with the PUSCH. The EPDCCH is frequency division multiplexed with the physical downlink shared channel (PDSCH), and used for transmitting the DCI, just as with the PDCCH.

The radio communication system 1 uses a physical uplink shared channel (PUSCH), a physical uplink control channel (PUCCH), a physical random access channel (PRACH), and the like shared among user terminals 20, as uplink channels. The PUSCH carries user data, higher layer control information, and the like. The PUSCH or the PUCCH carries uplink control information (UCI) including at least one of delivery confirmation information (ACK/NACK), channel quality indicator (CQI), and the like. The PRACH carries a random access preamble to establish connection with cells.

<Radio Base Station>

Figure 13:
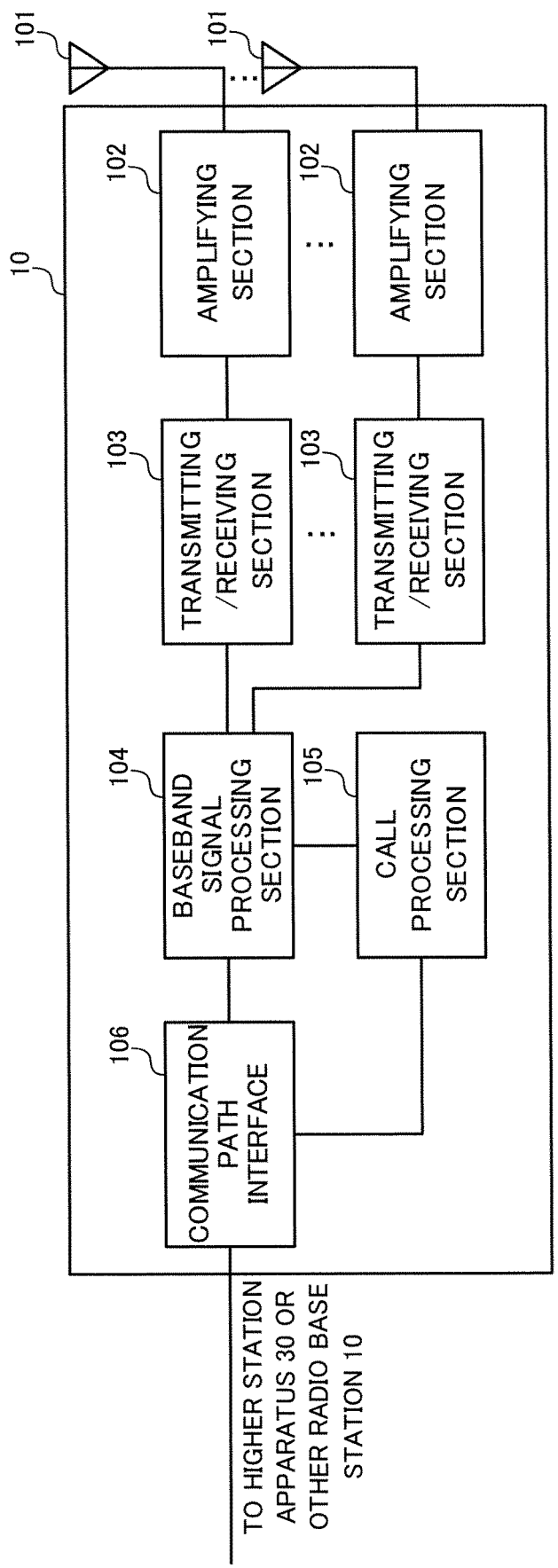
FIG. 13 is a drawing depicting an example of the entire configuration of a radio base station according to the embodiment.

FIG. 13 is a drawing depicting an example of the entire configuration of a radio base station according to the embodiment of the present invention. The radio base station 10 includes transmitting/receiving antennas 101, amplification sections 102, transmitting/receiving sections 103, a baseband signal processing section 104, a call processing section 105, and a communication path interface 106. The transmitting/receiving section 103 is constituted of a transmission section and a reception section.

User data to be transmitted from the radio base station 10 to the user terminal 20 on a downlink is inputted from the higher station apparatus 30 to the baseband signal processing section 104 through the communication path interface 106.

The baseband signal processing section 104 applies transmission processing, which includes radio link control (RLC) layer transmission processing such as packet data convergence protocol (PDCP) layer processing, the division and coupling of the user data, and RLC retransmission control, medium access control (MAC) retransmission control (e.g. hybrid automatic repeat request (HARQ) transmission processing), scheduling, a choice of a transmission format, channel encoding, inverse fast Fourier transform (IFFT) processing, precoding, and the like, to the user data, and transfer the processed user data to the transmitting/receiving sections 103. The baseband signal processing section 104 also applies transmission processing including channel encoding, IFFT processing, and the like to a downlink control signal, and transfers the processed downlink control signal to the transmitting/receiving sections 103.

The transmitting/receiving section 103 converts the baseband signal, which is pre-coded and outputted from the baseband signal processing section 104 on an antenna-by-antenna basis, into a signal in a radio frequency band, and transmits the converted signal. The radio frequency signal that is frequency-converted by the transmitting/receiving section 103 is amplified by the amplification section 102, and transmitted from the transmitting/receiving antenna 101.

The transmitting/receiving section (transmission section) 103 transmits the DL signal to the user terminal using short TTIs each of which is constituted of an even number of symbols of existing systems. The transmitting/receiving section (reception section) 103 receives an uplink control signal (e.g. ACK/NACK) in response to the DL signal on an uplink control channel allocated to short TTIs. The transmitting/receiving section 103 is constituted of a combination of a transmitter and a receiver, a transmitting/receiving circuit, or a transmitting/receiving device that is described based on common knowledge in the technical art of the present invention. The transmitting/receiving section 103 may be constituted of an integral transceiver unit, or a transmission unit and a reception unit.

As for an uplink signal, on the other hand, a radio frequency signal received by the transmitting/receiving antenna 101 is amplified by the amplification section 102. The transmitting/receiving section 103 receives the uplink signal amplified by the amplification section 102. The transmitting/receiving section 103 frequency-converts the reception signal into a baseband signal, and outputs the baseband signal to the baseband signal processing section 104.

The baseband signal processing section 104 applies fast Fourier transform (FFT) processing, inverse discrete Fourier transform (IDFT) processing, error correction decoding, reception processing for MAC retransmission control, and reception processing of a PLC layer and a PDCP layer to user data included in the inputted uplink signal. The processed uplink signal is transferred to the higher station apparatus 30 through the communication path interface 106. The call processing section 105 performs call processing such as settings and release of communication channels, state management of the radio base station 10, and management of radio resources.

The communication path interface 106 transmits and receives signals to and from the higher station apparatus 30 through a certain interface. The communication path interface 106 may transmit and receive (backhaul signaling) signals to and from other radio base station through an interface (e.g. a common public radio interface (CPRI)-compliant optical fiber or an X2 interface) between the radio base stations.

Figure 14:
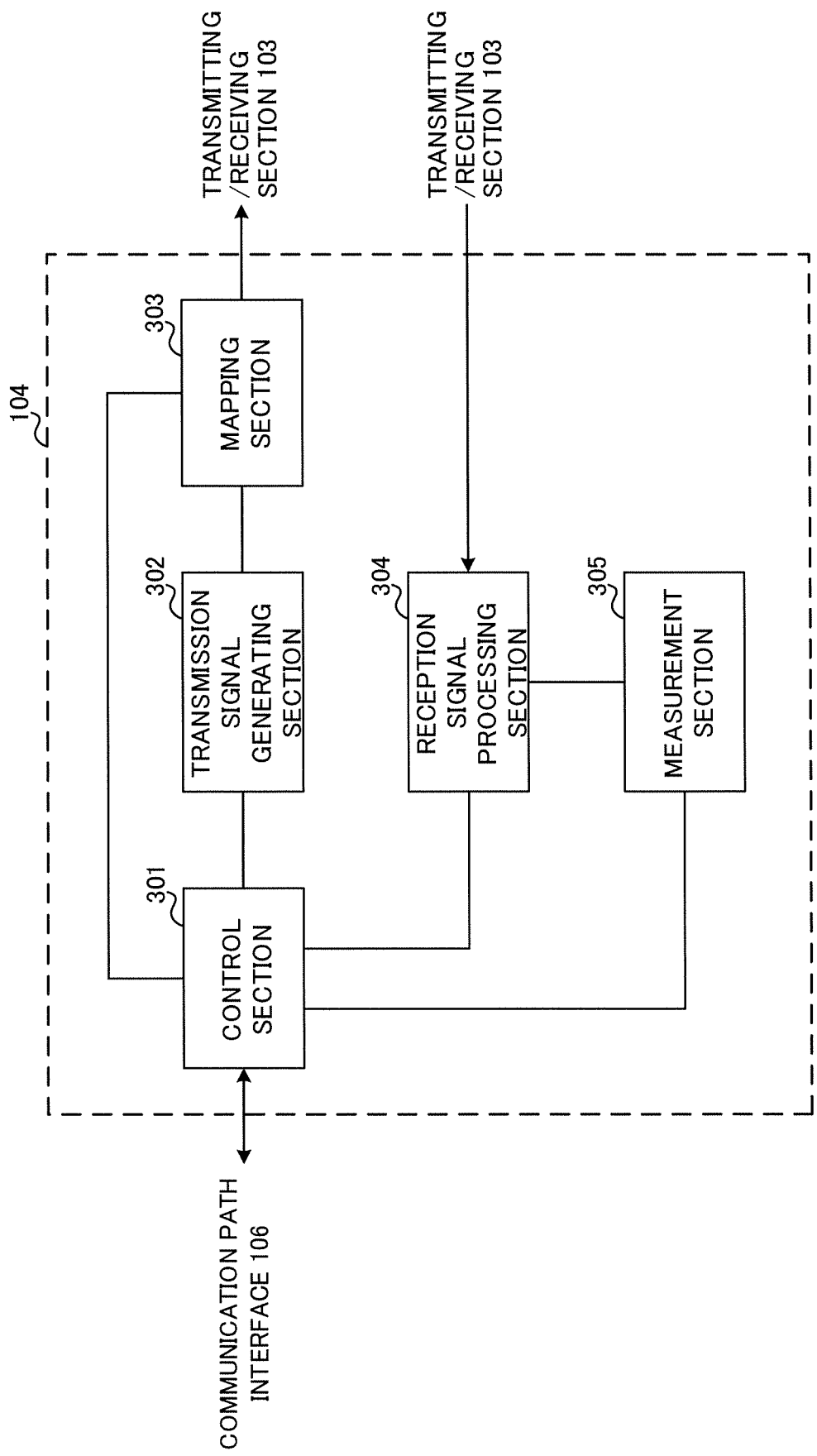
FIG. 14 is a drawing depicting an example of the functional configuration of the radio base station according to the embodiment.

FIG. 14 is a drawing depicting an example of the functional configuration of the radio base station according to this embodiment. FIG. 14 mainly depicts functional blocks that are features of the embodiment, and the radio base station 10 has other functional blocks required for radio communication. As depicted in FIG. 14, the baseband signal processing section 104 includes a control section (scheduler) 301, a transmission signal generation section (generation section) 302, a mapping section 303, a reception signal processing section 304, and a measurement section 305.

The control section (scheduler) 301 controls scheduling (e.g. resource allocation) of downlink data signals to be transmitted on the PDSCH and downlink control signals to be transmitted on the PDCCH or the EPDCCH. The control section 301 also controls the scheduling of system information, synchronization signals, paging information, cell-specific reference signals (CRS), channel state information reference signals (CSI-RS), and the like. The control section 301 also controls the scheduling of uplink reference signals in the short TTI, uplink data signals to be transmitted on the PUSCH, uplink control signals to be transmitted on the PUCCH and/or the PUSCH, and the like. The control section 301 is constituted of a controller, a control circuit, or a control device that is described based on common knowledge in the technical art of the present invention.

The transmission signal generation section 302 generates DL signals (including downlink data signals and downlink control signals) based on commands from the control section 301, and outputs the DL signals to the mapping section 303. To be more specific, the transmission signal generation section 302 generates downlink data signals (PDSCH) including user data and outputs the downlink data signal to the mapping section 303. The transmission signal generation section 302 generates downlink control signals (PDCCH/EPDCCH) including DCI (a UL grant), and outputs the downlink control signals to the mapping section 303. The transmission signal generation section 302 generates downlink reference signals such as CRS and CSI-RS, and outputs the downlink reference signals to the mapping section 303. The transmission signal generation section 302 is constituted of a signal generator, a signal generation circuit, or a signal generation device that is described based on common knowledge in the technical art of the present invention.

The mapping section 303 maps the DL signals generated by the transmission signal generation section 302 to certain radio resources based on commands from the control section 301, and outputs the mapped signals to the transmitting/receiving sections 103. The mapping section 303 is constituted of a mapper, a mapping circuit, or a mapping device that is described based on common knowledge in the technical art of the present invention.

The reception signal processing section 304 applies reception processing (for example, demapping, demodulation, decoding, and the like) to UL signals (HARQ-ACK, PUSCH, and the like) transmitted from the user terminals 20. Processing results are outputted to the control section 301. The reception signal processing section 304 is constituted of a signal processor, a signal processing circuit, or a signal processing device that is described based on common knowledge in the technical art of the present invention.

The measurement section 305 performs measurement on the received signals. For example, the measurement section 305 measures reception power (e.g. reference signal received power (RSRP)), reception quality (e.g. reference signal received quality (RSRQ)), a channel state, and the like of the received signal. Measurement results may be outputted to the control section 301. The measurement section 305 is constituted of a measurement instrument, a measurement circuit, or a measurement device that is described based on common knowledge in the technical art of the present invention.

<User Terminal>

Figure 15:
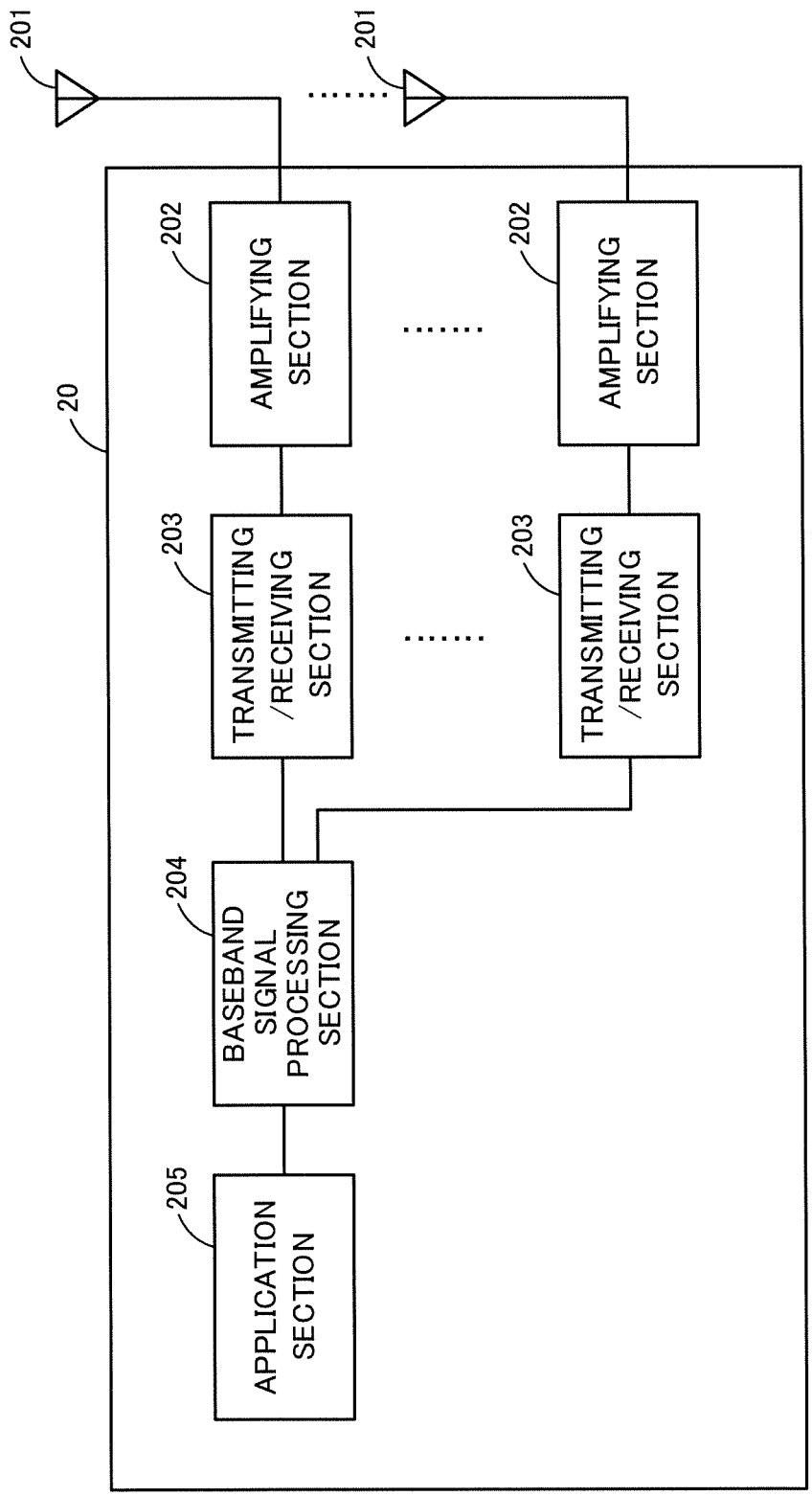
FIG. 15 is a drawing depicting an example of the entire configuration of a user terminal according to the embodiment.

FIG. 15 is a drawing depicting an example of the entire configuration of a user terminal according to the embodiment of the present invention. The user terminal 20 includes a plurality of transmitting/receiving antennas 201, amplification sections 202, and transmitting/receiving sections 203 for MIMO communication, a baseband signal processing section 204, and an application section 205. The transmitting/receiving section 203 may be constituted of a transmission unit and a reception unit.

Radio frequency signals received by the transmitting/receiving antennas 201 are amplified by the amplification sections 202. Each transmitting/receiving section 203 receives the downlink signal amplified by the amplification section 202. The transmitting/receiving section 203 frequency-converts the reception signal into a baseband signal, and outputs the baseband signal to the baseband signal processing section 204.

The transmitting/receiving section (transmission section) 203 can transmit an UL signal using at least one of a plurality of short TTIs contained in one subframe of existing systems. The transmitting/receiving section (reception section) 203 can receive a DL signal using at least one of the plurality of short TTIs contained in one subframe of the existing systems. The transmitting/receiving section 203 is constituted of a combination of a transmitter and a receiver, a transmitting/receiving circuit, or a transmitting/receiving device that is described based on common knowledge in the technical art of the present invention.

The baseband signal processing section 204 applies FFT processing, error correction decoding, reception processing for retransmission control, and the like to the inputted baseband signals. The processed downlink user data is transferred to the application section 205. The application section 205 performs processing related to higher layers than a physical layer and a MAC layer, and the like. Broadcast information of downlink data is also transferred to the application section 205.

On the other hand, uplink user data is inputted from the application section 205 to the baseband signal processing section 204. The baseband signal processing section 204 applies transmission processing for retransmission control (e.g. HARQ transmission processing), channel coding, precoding, discrete Fourier transform (DFT) processing, IFFT processing, and the like to the user data, and transfers the processed user data to each transmitting/receiving section 203. The transmitting/receiving section 203 converts the baseband signal outputted from the baseband signal processing section 204 into a signal in a radio frequency band, and transmits the converted signal. The radio frequency signal that is frequency-converted by the transmitting/receiving section 203 is amplified by the amplification section 202, and transmitted from the transmitting/receiving antenna 201.

Figure 16:
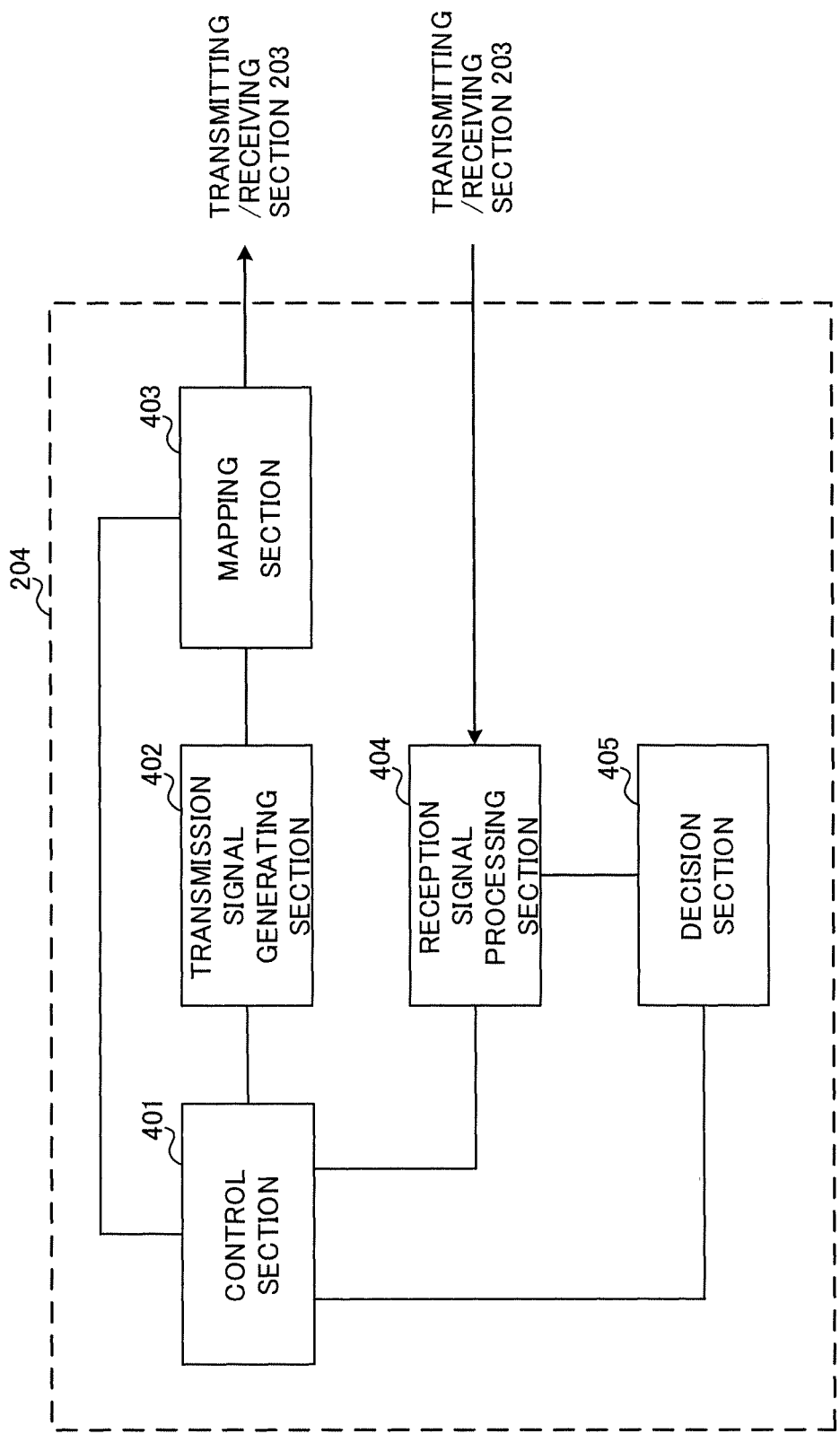
FIG. 16 is a drawing depicting an example of the functional configuration of the user terminal according to the embodiment.

FIG. 16 is a drawing depicting an example of the functional configuration of the user terminal according to this embodiment. FIG. 16 mainly depicts functional blocks that are features of the embodiment, and the user terminal 20 has other functional blocks required for radio communication. As depicted in FIG. 16, the baseband signal processing section 204 of the user terminal 20 includes a control section 401, a transmission signal generation section 402, a mapping section 403, a reception signal processing section 404, and a decision (determination) section 405.

The control section 401 receives downlink control signals (signals transmitted on PDCCH/EPDCCH) and downlink data signals (signals transmitted on PDSCH) transmitted from the radio base stations 10 through the reception signal processing section 404. The control section 401 controls generation of uplink control signals (e.g. a delivery confirmation signal (HARQ-ACK) and the like) and uplink data signals based on the downlink control signals, determination results of necessity for retransmission control for the downlink data signals, and the like. To be more specific, the control section 401 controls the transmission signal generation section 402, the mapping section 403, and the reception signal processing section 404.

The control section 401 controls the allocation of uplink control channels in short TTIs each of which is constituted of an even number of symbols of the existing systems. In this case, the control section 401 applies frequency hopping to each uplink control channel, and controls such that the uplink control channel allocated to different frequency ranges by the frequency hopping has an equal number of symbols (see FIGS. 6 to 8).

When the short TTI is constituted of six symbols, four symbols, or two symbols, the control section 401 controls so as not to allocate the uplink control channel to the first symbol and/or the last symbol of one subframe of the existing systems (see FIGS. 6 to 8). In this case, the control section 401 allocates uplink measurement reference signals (e.g. SRS) to the last symbol of one subframe of the existing systems.

The control section 401 controls the allocation of demodulation reference signals for uplink control channels or uplink data channels in each short TTI. For example, the control section 401 allocates a reference signal (DM-RS) used for demodulation of the uplink control channel to a region next to a region (resource element) to which the uplink control channel is allocated, in a temporal direction and/or in a frequency direction.

The control section 401 controls such that delivery confirmation signals in response to DL signals received in DL transmission short TTIs are fed back in UL transmission short TTIs after a certain time period in units of a subframe (see FIGS. 9 and 10). The number of the DL transmission short TTIs and the number of the UL transmission short TTIs contained in one subframe of the existing systems are set equal. The control section 401 can control the feedback of the delivery confirmation signals using a different number of HARQ processes from the existing systems. The control section 401 is constituted of a controller, a control circuit, or a control device that is described based on common knowledge in the technical art of the present invention.

The transmission signal generation section 402 generates UL signals based on commands from the control section 401, and outputs the generated signals to the mapping section 403. For example, the transmission signal generation section 402 generates uplink control signals such as a delivery confirmation signal (HARQ-ACK) and channel state information (CSI), based on commands from the control section 401.

The transmission signal generation section 402 generates uplink data signals based on commands from the control section 401. For example, when a downlink control signal issued from the radio base station 10 includes an UL grant, the control section 401 commands the transmission signal generation section 402 to generate an uplink data signal. The transmission signal generation section 402 is constituted of a signal generator, a signal generation circuit, or a signal generation device that is described based on common knowledge in the technical art of the present invention.

The mapping section 403 maps the uplink signals (uplink control signals and/or uplink data signals) generated by the transmission signal generation section 402 to radio resources based on commands from the control section 401, and outputs the mapped signals to the transmitting/receiving section 203. For example, the mapping is controlled by applying frequency hopping to uplink control channels in the short TTIs. The mapping section 403 is constituted of a mapper, a mapping circuit, or a mapping device that is described based on common knowledge in the technical art of the present invention.

The reception signal processing section 404 applies reception processing (for example, demapping, demodulation, decoding, and the like) to DL signals (for example, downlink control signals transmitted from the radio base stations, downlink control signals transmitted on PDSCH, and the like). The reception signal processing section 404 outputs the information received from the radio base stations 10 to the control section 401. The reception signal processing section 404 outputs, for example, broadcast information, system information, RRC signaling, DCI, and the like to the control section 401.

The reception signal processing section 404 is constituted of one of a signal processor, a signal processing circuit, and a signal processing device and one of a measurement instrument, a measurement circuit, and a measurement device that are described based on common knowledge in the technical art of the present invention. The reception signal processing section 404 constitutes a reception unit according to the present invention.

The decision (determination) section 405 performs retransmission control determination (ACK/NACK) based on a decoding result of the reception signal processing section 404, and outputs the determination result to the control section 401. When downlink signals (PDSCH) are transmitted from multiple CCs (e.g. six or more CCs), the determination section 405 performs the retransmission control determination (ACK/NACK) for each CC and outputs the determination results to the control section 401. The determination section 405 is constituted of a determination circuit or a determination device that is described based on common knowledge in the technical art of the present invention.

The block diagrams used in the above embodiments depict functional blocks. The functional blocks (elements) are realized by an arbitrary combination of hardware and software. A method for realizing each functional block is not specifically limited. In other words, each functional block may be realized by physically integrated one device, or physically separated two or more devices connected with or without wires.

For example, a part or all of each function of the radio base station 10 and the user terminal 20 may be realized by hardware such as an application specific integrated circuit (ASIC), a programmable logic device (PLD), and a field programmable gate array (FPGA). Each of the radio base station 10 and the user terminal 20 may be realized by a computer device including a central processing unit (CPU), a communication interface for network connection, a memory, a computer-readable recording medium for storing programs therein. In other words, the radio base station, the user terminal, and the like according to the embodiment of the present invention may function as computers that execute a radio communication method according to the present invention.

The processor, the memory, and the like are connected through a bus for communicating information. The computer-readable recording medium is a recording medium such as, for example, a flexible disk, a magneto-optical disk, a read only memory (ROM), an erasable programmable ROM (EPROM), a compact disc-ROM (CD-ROM), a random access memory (RAM), and a hard disk. The programs may be transmitted from a network through electric communication lines. Each of the radio base station 10 and the user terminal 20 may include an input device such as an input key, and an output device such as a display.

The functional configurations of the radio base station 10 and the user terminal 20 may be realized by the above hardware, software modules executed by the processor, or a combination of the both of the hardware and the software modules. The processor controls the entire user terminal by executing an operating system. The processor loads the programs, the software modules, and data from the recording medium, and executes various types of processing in accordance with the programs, the software modules, and the data.

The programs are not specifically limited as long as the programs make the computers to execute the operations described in the above embodiments. For example, the control section 401 of the user terminal 20 may be realized by a control program executed by the processor, and other functional blocks may be realized in the same manner.

The software, commands, and the like may be transmitted and received through a transmission medium. For example, when the software is transmitted from a website, a server, or another remote source using wired communication technology such as a coaxial cables, an optical fiber cable, a twisted-pair cable, and a digital subscriber line (DSL) and/or wireless communication technology such as infrared rays, radio, and microwaves, the wired and/or wireless communication technology is included in the definition of the transmission medium.

The terms described in this application and/or the terms required for understanding this application may be replaced with other terms that refer to the same or similar meanings. For example, the term "channel" and/or "symbol" may be replaced with the term "signal (signaling)". The term "signal" may be replaced with the term "message". The term "component carrier (CC)" may be replaced with the term "carrier frequency", "cell", or the like.

The information, parameters, and the like described in this application may be represented in absolute values, relative values with respect to a certain value, or other information corresponding thereto. For example, the radio resources may be indicated by indexes.

The information, signals, and the like described in this application may be represented by using any of various different techniques. For example, the data, instructions, commands, information, signals, bits, symbols, chips, and the like that can be mentioned in the whole of the above description may be represented by voltages, currents, electromagnetic waves, magnetic fields or magnetic particles, optical fields or photons, or arbitrary combinations thereof.

The aspects or embodiments described in this application may be used alone, in combination, or by switching in accordance with execution. Notification about certain information (for example, notification about being X) is not limited to be explicit, and may be implicit (for example, without the notification about the information).

Notification about information is not limited to the aspects or embodiments described in this application, but may be performed in another way. For example, the notification about information may be performed by physical layer signaling (e.g. downlink control information (DCI) and uplink control information (UCI)), higher layer signaling (e.g. radio resource control (RRC) signaling, medium access control (MAC) signaling, broadcast information (master information block (MIB) and system information blocks (SIBs)), another signal, or a combination thereof. The RRC signaling may be referred to as a RRC message, and may be, for example, a RRC Connection Setup message, an RRC Connection Reconfiguration message, or the like.

Each aspect or embodiment described in this application may be applied to systems using Long Term Evolution (LTE), LTE-Advanced (LTE-A), SUPER 3G, IMT-Advanced, 4G, 5G, Future Radio Access (FRA), CDMA2000, Ultra Mobile Broadband (UMB), IEEE 802.11 (Wi-Fi), IEEE 802.16 (WiMAX), IEEE 802.20, Ultra-WideBand (UWB), Bluetooth (trademark), and other appropriate systems, and/or next generation systems extended based thereon.

The processing procedure, sequence, flowchart, and the like of each aspect or embodiment described in this application may be permuted as long as there is no contradiction. For example, as to the method described in this application, various steps are proposed in an exemplary order, and are not limited to the specific proposed order.

The present invention is described above in detail, but as a matter of course, it is apparent for those skilled in the art that the present invention is not limited to the embodiments described in this application. The present invention can be modified and embodied in other forms without departing from the intent and scope of the present invention defined by claims. Therefore, this application is intended to exemplarily describe the present invention, and has no limitation to the present invention.

This application is based on Japanese Laid-open Patent Publication No. 2015-173258 filed on Sep. 2, 2015. This application includes all of the contents.

The invention claimed is:

1. A terminal comprising:
a receiver that receives a downlink (DL) signal in a first time unit of a plurality of time units included in a subframe;
a transmitter that transmits acknowledgement/negative acknowledgement (ACK/NACK) information for the DL signal using a physical uplink control channel (PUCCH) in a second time unit of a plurality of time units included in a subframe after a period in units of a subframe; and
a processor that when the second time unit has an even number of symbols, applies frequency hopping to the PUCCH in the second time unit, the frequency hopping being performed between a first half of the second time unit and a second half of the second time unit.

2. A radio communication method for a terminal, the radio communication method comprising:
receiving a downlink (DL) signal in a time unit of a plurality of time units included in a subframe;
transmitting acknowledgement/negative acknowledgement (ACK/NACK) information for the DL signal using a physical uplink control channel (PUCCH) in a second time unit of a plurality of time units included in a subframe after a period in units of a subframe; and
applying frequency hopping to the PUCCH in the second time unit, when the second time unit has an even number of symbols, the frequency hopping being performed between a first half of the second time unit and a second half of the second time unit.

3. The terminal according to claim 1, wherein the second time unit is a slot.

* * * * *